US008394545B2

(12) United States Patent
Muta et al.

(10) Patent No.: US 8,394,545 B2
(45) Date of Patent: Mar. 12, 2013

(54) FUEL CELL SYSTEM AND OPERATING METHOD THEREOF

(75) Inventors: Aoi Muta, Osaka (JP); Yoichiro Tsuji, Osaka (JP); Miho Gemba, Osaka (JP)

(73) Assignee: Panasonic Corporation, Osaka (JP)

( * ) Notice: Subject to any disclaimer, the term of this patent is extended or adjusted under 35 U.S.C. 154(b) by 1105 days.

(21) Appl. No.: 12/090,766

(22) PCT Filed: Oct. 19, 2006

(86) PCT No.: PCT/JP2006/320877
§ 371 (c)(1),
(2), (4) Date: Apr. 18, 2008

(87) PCT Pub. No.: WO2007/046483
PCT Pub. Date: Apr. 26, 2007

(65) Prior Publication Data
US 2009/0123788 A1    May 14, 2009

(30) Foreign Application Priority Data
Oct. 19, 2005   (JP) .................................. 2005-304292

(51) Int. Cl.
*H01M 8/04* (2006.01)
(52) U.S. Cl. ....................................................... 429/429
(58) Field of Classification Search .................. 429/434, 429/429
See application file for complete search history.

(56) References Cited

U.S. PATENT DOCUMENTS

| 2004/0126634 A1 | 7/2004 | Hatoh et al. | |
| 2004/0146761 A1* | 7/2004 | Cargnelli et al. | 429/22 |
| 2004/0180248 A1* | 9/2004 | Matsubayashi et al. | 429/26 |
| 2004/0191600 A1* | 9/2004 | Gyoten et al. | 429/30 |
| 2006/0251943 A1 | 11/2006 | Hatoh et al. | |

FOREIGN PATENT DOCUMENTS

| JP | 4-502749 | | 5/1992 |
| JP | 06-251788 | * | 9/1994 |
| JP | 2002-280029 | | 9/2002 |
| JP | 2003-178780 | * | 6/2003 |
| JP | 2004-006166 | | 1/2004 |
| JP | 2004-163037 | | 6/2004 |
| JP | 2004-165037 | * | 6/2004 |
| JP | 2004-296384 | | 10/2004 |
| JP | 2004-363027 | | 12/2004 |
| JP | 2005-209634 | | 8/2005 |
| WO | WO 02/47190 A1 | | 6/2002 |

* cited by examiner

*Primary Examiner* — Ula C Ruddock
*Assistant Examiner* — Frank Chernow
(74) *Attorney, Agent, or Firm* — McDermott Will & Emery LLP

(57) ABSTRACT

The present invention includes a fuel cell (11), a fuel gas supplying device (16), an oxidizing gas supplying device (17) and a control apparatus (20) and further includes at least one of a temperature control device (19) which controls the temperature of the fuel cell (11) and a humidifying device (24) which humidifies at least one of the fuel gas and the oxidizing gas to be supplied to the fuel cell (11), wherein: the control apparatus (20) controls at least one of the temperature control device (19), the humidifying device (24), the fuel cell (11) and the fuel gas supplying device (16) to cause the temperature of the fuel cell (11) to be equal to at least one of the dew point of the fuel gas and the dew point of the oxidizing gas, before cutting off an electrical connection between the fuel cell (11) and a load; and then the control apparatus (20) cuts off the electrical connection between the fuel cell (11) and the load.

15 Claims, 16 Drawing Sheets

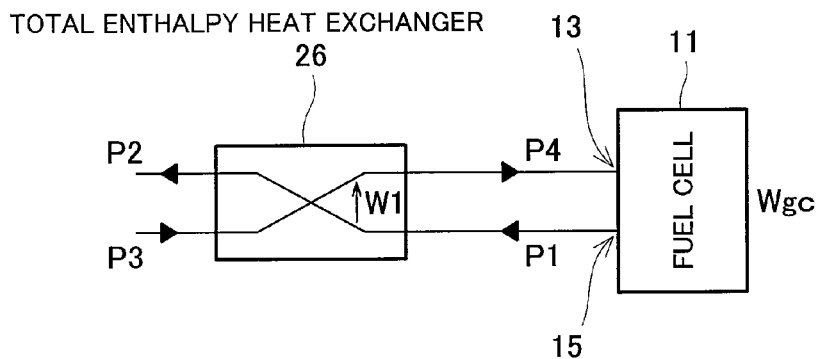

TOTAL ENTHALPY HEAT EXCHANGER 26

- P1: STEAM AMOUNT OF DISCHARGED OXIDIZING GAS
- P2: STEAM AMOUNT OF DISCHARGED OXIDIZING GAS UTILIZED FOR HUMIDIFICATION
- P3: STEAM AMOUNT OF OXIDIZING GAS
- P4: STEAM AMOUNT OF HUMIDIFIED OXIDIZING GASS
- W1: AMOUNT OF WATER PASSED THROUGH TOTAL ENTHALPY HEAT EXCHANGE MEMBRANE
- Wg: AMOUNT OF WATER GENERATED IN FUEL CELL
- Wgc: AMOUNT OF WATER ADDED TO OXIDIZING GAS SIDE IN FUEL CELL $$P1 = P4 + Wgc = P3 + W1 + Wg * \{1 - \theta \text{ (BACK DIFFUSION RATIO)}\} \quad \cdots (1)$$

$$P2 = P1 - W1 = (P3 + W1 + Wgc) - W1 = P3 + Wgc \quad \cdots (2)$$

$$P3 = \alpha \text{ (CONSTANT)} \quad \cdots (3)$$

$$P4 = P3 + W1$$

$$= P3 + \beta \text{ (AREA OF TOTAL ENTHALPY HEAT EXCHANGE MEMBRANE OF HUMIDIFIER)}$$
$$\quad * \gamma \text{ (WATER VAPOR TRANSMISSION COEFFICIENT)} * D \text{ (LOGARITHMIC AVERAGE WATER VAPOR PARTIAL PRESSURE DIFFERENCE)}$$

$$= P3 + \beta * \gamma * \frac{(P1-P3)-(P2-P4)}{\ln\{(P1-P3)/(P2-P4)\}} \quad \cdots (4)$$

| CALCULATE P4 FROM FORMULAS (1) TO (4), P3 AND Wg (MEASURABLE FROM OPERATING CONDITION) |

| CALCULATE DEW POINT OF HUMIDIFIED OXIDIZING GAS FROM P4 |

Fig. 14

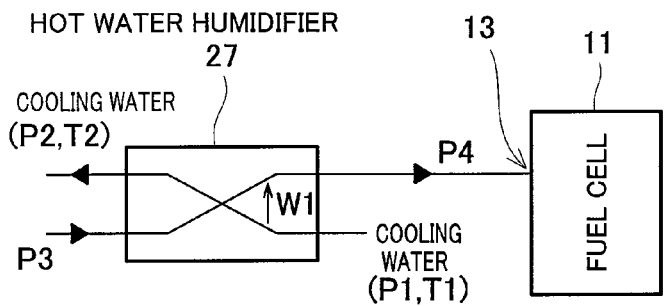

{
P1: SATURATED STEAM AMOUNT AT T1
P2: SATURATED STEAM AMOUNT AT T2
P3: STEAM AMOUNT OF OXIDIZING GAS
P4: STEAM AMOUNT OF HUMIDIFIED OXIDIZING GAS
W1: AMOUNT OF WATER PASSED THROUGH HUMIDIFYING MEMBRANE
T1: TEMPERATURE OF COOLING WATER AT OUTLET OF FUEL CELL
T2: TEMPERATURE OF COOLING WATER AT INLET OF FUEL CELL
}

$P1 = S1$ (MEASURABLE) ·····(1)

$P2 = S2$ (MEASURABLE) ·····(2)

$P3 = \alpha$ (CONSTANT) ·····(3)

$P4 = P3 + W1$ $= P3 + \beta$ (AREA OF TOTAL ENTHALPY HEAT EXCHANGE MEMBRANE OF HUMIDIFIER)
  $* \gamma$ (WATER VAPOR TRANSMISSION COEFFICIENT) $* D$ (LOGARITHMIC AVERAGE WATER VAPOR PARTIAL PRESSURE DIFFERENCE)

$$= P3 + \beta * \gamma * \frac{(P1-P3)-(P2-P4)}{\ln\{(P1-P3)/(P2-P4)\}} \quad \cdots\cdots(4)$$

| CALCULATE P4 FROM FORMULAS (1) TO (4), P3, T1 AND T2 (MEASURABLE) |

| CALCULATE DEW POINT OF HUMIDIFIED OXIDIZING GAS FROM P4 |

Fig. 16

FUEL CELL SYSTEM AND OPERATING METHOD THEREOF

RELATED APPLICATIONS

This application is the U.S. National Phase under 35 U.S.C. §371 of International Application No. PCT/JP2006/320877, filed on Oct. 19, 2006, which in turn claims the benefit of Japanese Application No. 2005-304292, filed on Oct 19, 2005, the disclosures of which Applications are incorporated by reference herein.

TECHNICAL FIELD

The present invention relates to a fuel cell system which generates electric power by utilizing a fuel gas containing hydrogen and an oxidizing gas containing oxygen, and to an operating method thereof.

BACKGROUND ART

In the case of a fuel cell system capable of highly-efficient small-scale electric power generation, it is easy to construct a system for utilizing heat energy generated during the electric power generation. Therefore, the fuel cell system is being developed as a distributed electric power generating system capable of realizing a high energy use efficiency.

The fuel cell system includes a fuel cell as a main body of its electric power generating section. Examples of such fuel cell are a phosphoric-acid fuel cell, a fused carbonate fuel cell, an alkaline fuel cell and a polymer electrolyte fuel cell. Among these fuel cells, the polymer electrolyte fuel cell is capable of generating electric power at a comparatively low temperature of about 130 degrees C. to 150 degrees C., and has features that are a high output density and a long life. Therefore, the polymer electrolyte fuel cell is expected to be applied to, for example, a power source of an electric car which requires a high output characteristic and a short start time at the same time, and a cogeneration system for domestic use which requires long-term reliability.

At the time of the electric power generating operation by the polymer electrolyte fuel cell, the fuel gas containing hydrogen is supplied to an anode side whereas the oxidizing gas containing oxygen is supplied to a cathode side. In the anode of the polymer electrolyte fuel cell, the supplied hydrogen is converted into electrons and protons. The electrons generated in the anode pass through an external load connected to the fuel cell system and reach the cathode of the polymer electrolyte fuel cell. The protons generated in the anode pass through a polymer electrolyte membrane and reach the cathode. Meanwhile, in the cathode of the polymer electrolyte fuel cell, water is generated by using the electrons having passed through the external load and reached the cathode, the protons having passed through the polymer electrolyte membrane and reached the cathode, and oxygen having been supplied to the cathode side. Note that the fuel gas is supplied from, for example, a fuel gas supplying device which generates hydrogen from a methane gas by a steam-reforming reaction. Moreover, the oxidizing gas is supplied from, for example, an oxidizing gas supplying device which takes in the air from the atmosphere by a sirocco fan.

Incidentally, in the fuel cell system including the polymer electrolyte fuel cell, in order to secure the conductivity of protons from the anode side to the cathode side, the polymer electrolyte membrane need to be maintained in a wet state. Therefore, in this fuel cell system, the humidified fuel gas and the humidified oxidizing gas are supplied to the anode side and the cathode side, respectively. Moreover, in this fuel cell system, in order to adequately secure the energy conversion efficiency when converting the free energy change of the chemical reaction into the electric energy, for example, the polymer electrolyte fuel cell is operated under such an operating condition (hereinafter referred to as "low humidification operating condition") that mutual relationships that are $Tcell > Tda$ and $Tcell > Tdc$ are satisfied where $Tda$ denotes the dew point of the fuel gas, $Tdc$ denotes the dew point of the oxidizing gas, and $Tcell$ denotes the temperature of the polymer electrolyte fuel cell. With this, the fuel cell system stably achieves a predetermined electric power generating performance for a long period of time (see Patent Document 1 for example).

Meanwhile, regarding the electric power generating operation of the fuel cell system, since it is unnecessary to carry out the electric power generating operation in a case where both the electric energy and the heat energy generated by the fuel cell system are unnecessary, the fuel cell system adopts a start-stop type operating method for starting or stopping the electric power generating operation of the polymer electrolyte fuel cell depending on the situation. In the start-stop type operating method, in the case where both the electric energy and the heat energy are unnecessary, a control apparatus of the fuel cell system stops operations of the fuel gas supplying device and the oxidizing gas supplying device, and then cuts off an electrical connection between the polymer electrolyte fuel cell and the external load. Thus, the polymer electrolyte fuel cell becomes an open circuit state. Then, in order to prevent the polymer electrolyte membrane from drying, the control apparatus encloses the humidified inactive gas in the polymer electrolyte fuel cell. Alternatively, the control apparatus cuts off connections between the polymer electrolyte fuel cell and the fuel gas supplying device and between the polymer electrolyte fuel cell and the oxidizing gas supplying device, and hermetically closes a fuel gas passage and an oxidizing gas passage. With this, the fuel cell system prevents the polymer electrolyte membrane from drying for a long period of time (see Patent Documents 2, 3 and 4 for example).

Patent Document 1: Japanese Patent Application 4-502749
Patent Document 2: Japanese Laid-Open Patent Application Publication 6-251788
Patent Document 3: Japanese Laid-Open Patent Application Publication 2004-163037
Patent Document 4: Japanese Laid-Open Patent Application Publication

DISCLOSURE OF THE INVENTION

Problems to be Solved by the Invention

However, the above-described conventional fuel cell system has such a problem that although the polymer electrolyte membrane is prevented from drying for a long period of time by encapsulating the humidified inactive gas or hermetically closing the fuel gas passage and the oxidizing gas passage, the deterioration of the polymer electrolyte membrane progresses, and the electric power generating performance of the polymer electrolyte fuel cell decreases with time. This is because when the fuel cell system stops the electric power generating operation, the electrical connection between the polymer electrolyte fuel cell operated under the low humidification operating condition and the external load is cut off, and the polymer electrolyte fuel cell becomes the open circuit state.

The present invention was made to solve the above problem, and an object of the present invention is to provide a fuel cell system which has an excellent durability and is capable of preventing the polymer electrolyte membrane from deteriorating when the polymer electrolyte fuel cell operated under the low humidification operating condition shifts to the open circuit state, and to provide an operating method thereof.

Means for Solving the Problems

As a result of diligent studies to achieve the above objects, the present inventors have found that based on the fact that the polymer electrolyte membrane tends to deteriorate by drying especially when stopping the electric power generating operation of the fuel cell system operated under the low humidification operating condition, adjusting the water content of the polymer electrolyte membrane while maintaining the output voltage in a predetermined range lower than the open circuit voltage before stopping the electrical discharge of the polymer electrolyte fuel cell is very effective to achieve the above object. Thus, the present inventors have achieved the present invention.

That is, a fuel cell system of the present invention includes: a fuel cell which generates electric power using a fuel gas containing hydrogen and an oxidizing gas containing oxygen; a fuel gas supplying device which supplies the fuel gas to the fuel cell; an oxidizing gas supplying device which supplies the oxidizing gas to the fuel cell; and a control apparatus which controls at least the fuel cell, the fuel gas supplying device and the oxidizing gas supplying device, the fuel cell system further including: at least one of a temperature control device which controls a temperature of the fuel cell and a humidifying device which humidifies at least one of the fuel gas and the oxidizing gas to be supplied to the fuel cell, wherein: the control apparatus controls at least one of the temperature control device, the humidifying device, the fuel cell and the fuel gas supplying device based on at least one of a dew point of the fuel gas and a dew point of the oxidizing gas or on information related to the dew point to cause the temperature of the fuel cell to be equal to at least one of the dew point of the fuel gas and the dew point of the oxidizing gas, before cutting off an electrical connection between the fuel cell and a load; and then the control apparatus cuts off the electrical connection between the fuel cell and the load.

Moreover, a method for operating a fuel cell system according to the present invention includes the steps of: driving a fuel cell which generates electric power using a fuel gas containing hydrogen and an oxidizing gas containing oxygen, a fuel gas supplying device which supplies the fuel gas to the fuel cell, an oxidizing gas supplying device which supplies the oxidizing gas to the fuel cell, and a control apparatus which controls at least the fuel cell, the fuel gas supplying device and the oxidizing gas supplying device; further driving at least one of a temperature control device which controls a temperature of the fuel cell and a humidifying device which humidifies at least one of the fuel gas and the oxidizing gas to be supplied to the fuel cell; and controlling, by the control apparatus, at least one of the temperature control device, the humidifying device, the fuel cell and the fuel gas supplying device based on at least one of a dew point of the fuel gas and a dew point of the oxidizing gas or on information related to the dew point to cause the temperature of the fuel cell to be equal to at least one of the dew point of the fuel gas and the dew point of the oxidizing gas, before cutting off an electrical connection between the fuel cell and a load, and then cutting off the electrical connection between the fuel cell and the load by the control apparatus.

With this configuration, in the process of shifting from the electric power generating operation of the fuel cell system to the stopping of the electric power generating operation, since the control apparatus cuts off the electrical connection between the fuel cell and the load after the control apparatus controls at least one of the temperature control device and the humidifying device to cause the temperature of the fuel cell to be equal to at least one of the dew point of the fuel gas and the dew point of the oxidizing gas, the water content of the polymer electrolyte membrane can be increased relatively, and the deterioration of the polymer electrolyte membrane can be suppressed. Thus, it is possible to provide the fuel cell system having excellent durability.

Moreover, in the fuel cell system and the operating method thereof according to the present invention, the control apparatus controls the temperature control device to decrease the temperature of the fuel cell to thereby cause the temperature of the fuel cell to be equal to at least one of the dew point of the fuel gas and the dew point of the oxidizing gas.

With this configuration, since the temperature of the fuel cell is decreased by controlling the temperature control device, it is possible to easily cause the temperature of the fuel cell to be equal to at least one of the dew point of the fuel gas and the dew point of the oxidizing gas.

In this case, the control apparatus causes the temperature of the fuel cell to be equal to a lower one of the dew point of the fuel gas and the dew point of the oxidizing gas.

With this configuration, since the temperature of the fuel cell is caused to be equal to a lower one of the dew point of the fuel gas and the dew point of the oxidizing gas, the water content of the polymer electrolyte membrane can be further increased, and the deterioration of the polymer electrolyte membrane can be suppressed further effectively.

Moreover, in this case, when the control apparatus decreases the temperature of the fuel cell, the control apparatus controls an output current density of the fuel cell to be equal to or lower than an output current density at the time of generating the electric power.

With this configuration, since, when decreasing the temperature of the fuel cell, the output current density of the fuel cell is controlled to be equal to or lower than the output current density at the time of generating the electric power, the amount of water generated with the electric power generation can be suppressed. Thus, it is possible to prevent the clogging of the passage in the fuel cell from occurring.

Moreover, in this case, the control apparatus controls at least one of a flow rate and a temperature of a cooling medium in the temperature control device to decrease the temperature of the fuel cell.

With this configuration, since at least one of the flow rate and the temperature of the cooling medium in the temperature control device is controlled, the temperature of the fuel cell can be decreased easily.

Moreover, in the fuel cell system and the operating method thereof according to the present invention, the control apparatus controls the humidifying device to increase at least one of the dew point of the fuel gas and the dew point of the oxidizing gas to thereby cause the temperature of the fuel cell to be equal to at least one of the dew point of the fuel gas and the dew point of the oxidizing gas.

With this configuration, since at least one of the dew point of the fuel gas and the dew point of the oxidizing gas is increased by controlling the humidifying device, the temperature of the fuel cell can be easily caused to be equal to at least one of the dew point of the fuel gas and the dew point of the oxidizing gas.

In this case, the control apparatus causes the temperature of the fuel cell to be equal to a lower one of the dew point of the fuel gas and the dew point of the oxidizing gas.

With this configuration, since the temperature of the fuel cell is caused to be equal to a lower one of the dew point of the fuel gas and the dew point of the oxidizing gas, the water content of the polymer electrolyte membrane can be further increased, and the deterioration of the polymer electrolyte membrane can be suppressed further effectively.

Moreover, in this case, when the control apparatus increases the dew point, the control apparatus controls an output current density of the fuel cell to be equal to or lower than an output current density at the time of generating the electric power.

With this configuration, since, when increasing at least one of the dew point of the fuel gas and the dew point of the oxidizing gas, the output current density of the fuel cell is controlled to be equal to or lower than the output current density at the time of generating the electric power, the amount of water generated with the electric power generation can be suppressed. Thus, it is possible to prevent the clogging of the passage in the fuel cell from occurring.

Moreover, in this case, the control apparatus controls a temperature of a humidifier in the humidifying device by at least one of a flow rate and a temperature of at least one of the fuel gas and the oxidizing gas to increase at least one of the dew point of the fuel gas and the dew point of the oxidizing gas.

With this configuration, since the temperature of the humidifier in the humidifying device is controlled by at least one of the flow rate and the temperature of at least one of the fuel gas and the oxidizing gas, it is possible to easily increase at least one of the dew point of the fuel gas and the dew point of the oxidizing gas.

Moreover, in the fuel cell system and the operating method thereof according to the present invention, the information related to the dew point is an operating condition of the fuel gas supplying device, and an operating condition of the fuel gas supplying device is utilized as the information related to the dew point.

With this configuration, the dew point of the fuel gas and the dew point of the oxidizing gas can be detected without using the dew point sensor.

Moreover, in the fuel cell system and the operating method thereof according to the present invention, the information related to the dew point is an operating condition of at least one of the fuel cell and the humidifying device, and an operating condition of at least one of the fuel cell and the humidifying device is utilized as the information related to the dew point.

Again, with this configuration, the dew point of the fuel gas and the dew point of the oxidizing gas can be detected without using the dew point sensor.

Moreover, in the fuel cell system and the operating method thereof according to the present invention, the control apparatus controls the dew point of the fuel gas to be lower than the temperature of the fuel cell before the control apparatus causes the temperature of the fuel cell to be equal to at least one of the dew point of the fuel gas and the dew point of the oxidizing gas.

Moreover, in the fuel cell system and the operating method thereof according to the present invention, the control apparatus controls the dew point of the oxidizing gas to be lower than the temperature of the fuel cell before the control apparatus causes the temperature of the fuel cell to be equal to at least one of the dew point of the fuel gas and the dew point of the oxidizing gas.

Effects of the Invention

The present invention is carried out by the above-described means, and it is possible to provide a fuel cell system which has an excellent durability and is capable of preventing the polymer electrolyte membrane from deteriorating when the polymer electrolyte fuel cell operated under the low humidification operating condition shifts to the open circuit state, and to provide an operating method thereof.

BRIEF DESCRIPTION OF THE DRAWINGS

FIG. 14 is an explanatory diagram schematically showing the configuration for calculating the dew point of the oxidizing gas humidified by a total enthalpy heat exchanger.

FIG. 16 is an explanatory diagram schematically showing the configuration for calculating the dew point of the oxidizing gas humidified by a hot water humidifier.

Figure 1:
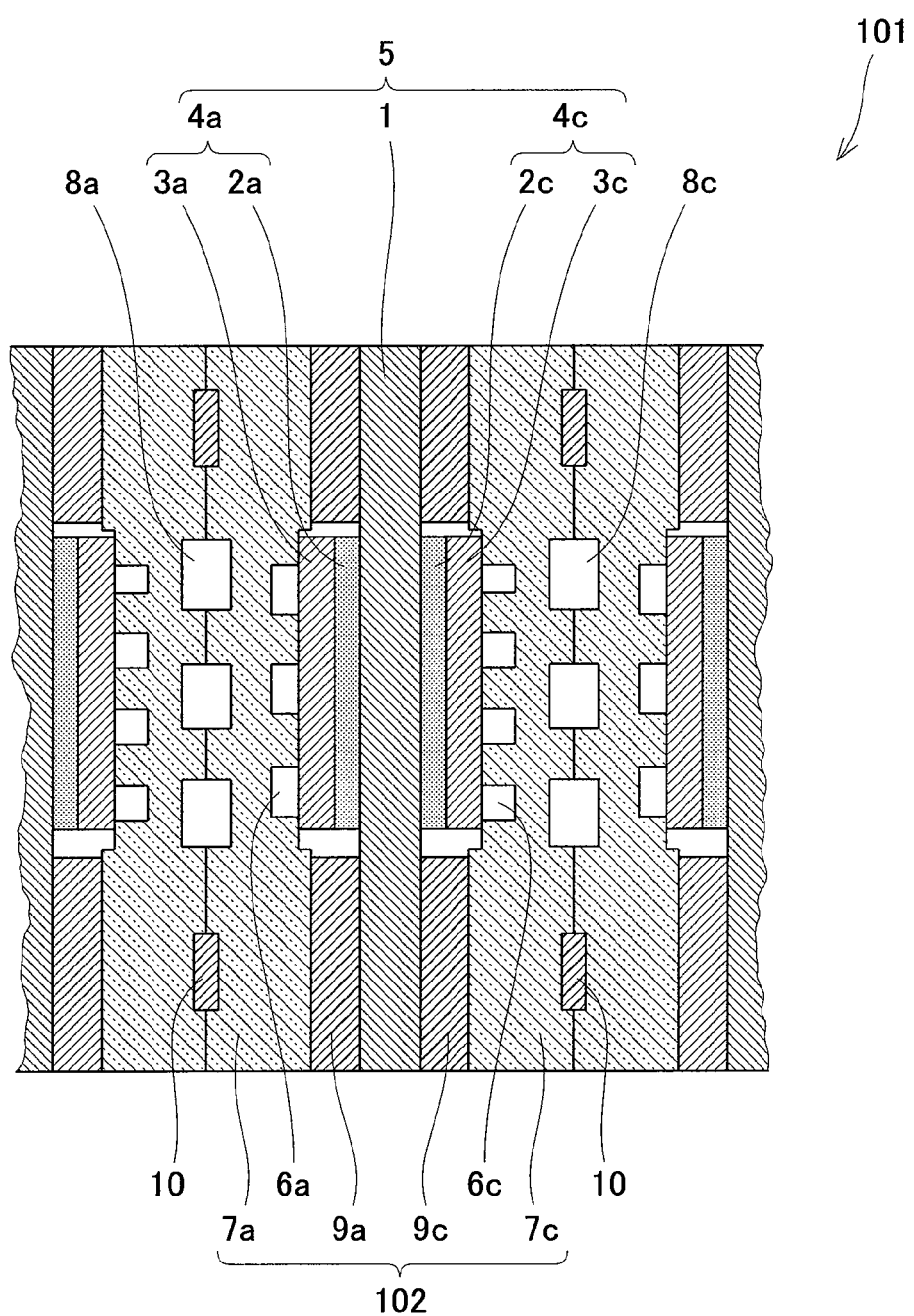
FIG. 1 is a cross-sectional view schematically showing the configuration of a cross section of a fuel cell of a fuel cell system according to Embodiment 1 of the present invention.

EXPLANATION OF REFERENCE NUMBERS 1 polymer electrolyte membrane
2a, 2c catalyst reaction layer
3a, 3c gas diffusion layer
4a anode
4c cathode
5 MEA (membrane-electrode assembly)
6a fuel gas passage
6c oxidizing gas passage
7a, 7c separator
8a, 8c cooling water passage
9a, 9c gasket
10 gasket
11 fuel cell (polymer electrolyte fuel cell)
12 fuel gas supplying portion
13 oxidizing gas supplying portion
14 fuel gas discharging portion
17 oxidizing gas discharging portion
16 fuel gas supplying device
17 oxidizing gas supplying device
18 humidifying device
18a, 18c humidifier
19 temperature control device
20 control apparatus
21a, 21c dew point sensor
22 temperature sensor
23 control unit
24 dew point control device
25 three-way valve
26 total enthalpy heat exchanger
27 hot water humidifier
101 fuel cell (essential part)
102 single cell (cell)
100 to 400 fuel cell system

BEST MODE FOR CARRYING OUT THE INVENTION

Hereinafter, the best mode for carrying out the present invention will be explained in detail with reference to the drawings. In the best mode for carrying out the present invention, a fuel cell system including a polymer electrolyte fuel cell is simply referred to as "fuel cell system", a polymer electrolyte fuel cell is simply referred to as "fuel cell", and a membrane-electrode assembly is simply referred to as "MEA".

Embodiment 1

First, the configuration of a fuel cell system according to Embodiment 1 of the present invention will be explained with reference to FIGS. 1 and 2.

FIG. 1 is a cross-sectional view schematically showing the configuration of a cross section of a fuel cell of the fuel cell system according to Embodiment 1 of the present invention. Note that FIG. 1 shows only essential parts of the fuel cell for the purpose of clearly explaining the basic configuration of the fuel cell.

As shown in FIG. 1, in a fuel cell 101, gaskets 9a and 9c are disposed on a peripheral portion of an MEA 5, and these members are sandwiched between separators 7a and 7c. These members constitute a single cell 102 ("single cell" is hereinafter referred to as "cell") in the fuel cell 101. By stacking a plurality of cells 102 in series, the fuel cell 101 is formed.

More specifically, as shown in FIG. 1, the MEA 5 includes a polymer electrolyte membrane 1 having proton conductivity. The polymer electrolyte membrane 1 in a water-retaining state selectively transports protons. The proton transport property of the polymer electrolyte membrane 1 is realized by ionizing fixed charge fixed to the polymer electrolyte membrane 1 in the water-retaining state and making hydrogen, which functions as counter ions of the fixed charge, movable by ionizing the hydrogen. As shown in FIG. 1, catalyst reaction layers 2a and 2c each of whose major component is carbon powder supporting platinum-based metal catalyst are disposed on center portions of both surfaces of the polymer electrolyte membrane 1, respectively, so as to face each other. In the catalyst reaction layer 2a among these catalyst reaction layers, hydrogen derived from the fuel gas supplied from the fuel gas supplying device (not shown in FIG. 1) is converted into electrons and protons as shown by Chemical Formula (1). The electrons generated in the catalyst reaction layer 2a pass through an external load (not shown in FIG. 1) connected to the fuel cell system and reach the catalyst reaction layer 2c. Moreover, the protons generated in the catalyst reaction layer 2a pass through the polymer electrolyte membrane 1 and reach the catalyst reaction layer 2c. Meanwhile, in the catalyst reaction layer 2c of the fuel cell 101, water is generated by the electrons having passed through the external load and reached the catalyst reaction layer 2c, the protons having passed through the polymer electrolyte membrane 1 and reached the catalyst reaction layer 2c, and oxygen derived from the oxidizing gas supplied from the oxidizing gas supplying device (not shown in FIG. 1), as shown in Chemical Formula (2). By a series of these chemical reactions, the fuel cell 101 outputs electric power and generates heat.

$$H_2 \rightarrow 2H^+ + 2e^- \qquad \text{Chemical Formula (1)}$$

$$(\tfrac{1}{2})O_2 + 2H^+ + 2e^- \rightarrow H_2O \qquad \text{Chemical Formula (2)}$$

As shown in FIG. 1, a gas diffusion layer 3a is disposed on a surface of the catalyst reaction layer 2a which surface does not contact the polymer electrolyte membrane 1 and a gas diffusion layer 3c is disposed on a surface of the catalyst reaction layer 2c which surface does not contact the polymer electrolyte membrane 1 such that the gas diffusion layers 3a and 3c face each other. The gas diffusion layers 3a and 3c have permeability to the fuel gas and the oxidizing gas and electrical conductivity, and are disposed so as to be electrically connected to surfaces of the catalyst reaction layer 2a and the catalyst reaction layer 2c, respectively.

In the fuel cell 101, the catalyst reaction layer 2a and the gas diffusion layer 3a constitute an anode 4a. In the fuel cell 101, the catalyst reaction layer 2c and the gas diffusion layer 3c constitute a cathode 4c. Further, in the fuel cell 101, the polymer electrolyte membrane 1, the anode 4a and the cathode 4c constitute the MEA 5.

Meanwhile, as shown in FIG. 1, the polymer electrolyte membrane 1 of the MEA 5 is sandwiched between the electrically insulating gaskets 9a and 9c, and the gaskets 9a and 9c are sandwiched between the electrically conductive separators 7a and 7c. Thus, the cell 102 is formed in the fuel cell 101. In the cell 102, a fuel gas passage 6a is concavely formed on a surface of the separator 7a which surface contacts the gas diffusion layer 3a. The fuel gas passage 6a supplies the fuel gas, supplied from the fuel gas supplying device, to the gas diffusion layer 3a of the MEA 5, and discharges the gas generated by the catalyst reaction and excess fuel gas to outside of the cell 102. Also, in the cell 102, an oxidizing gas passage 6c is concavely formed on a surface of the separator 7c which surface contacts the gas diffusion layer 3c. The oxidizing gas passage 6c supplies the oxidizing gas, supplied from the oxidizing gas supplying device, to the gas diffusion layer 3c of the MEA 5, and discharges the gas generated by the catalyst reaction and excess oxidizing gas to outside of the cell 102. Moreover, the separator 7a and the gas diffusion layer 3a are electrically connected to each other, and the separator 7c and the gas diffusion layer 3c are also electrically connected to each other.

As shown in FIG. 1, by electrically stacking a plurality of cells 102 in series, the fuel cell 101 is formed. In the fuel cell 101, a plurality of cells 102 are electrically stacked in series such that the separator 7a of one cell 102 is electrically connected to the separator 7c of the other cell 102 to obtain a desired output voltage. Moreover, in the fuel cell 101, a concave portion is formed on a surface of the separator 7a which surface contacts the separator 7c and a concave portion is formed on a surface of the separator 7c which surface contacts the separator 7a such that these concave portions face each other. Thus, a cooling water passage 8a and a cooling water passage 8c are formed. Moreover, in order to prevent the leakage of the cooling water flowing in the cooling water passages 8a and 8c, a gasket 10 is disposed between the separators 7a and 7c. To the cooling water passage 8a and the cooling water passage 8c, the cooling water is supplied from a cooling water supplying device (not shown in FIG. 1). The cooling water cools down the fuel cell 101 which generates heat at the time of the electric power generating operation. Note that the heat energy recovered from the fuel cell 101 by the cooling water is used for, for example, hot water supply.

Figure 2:
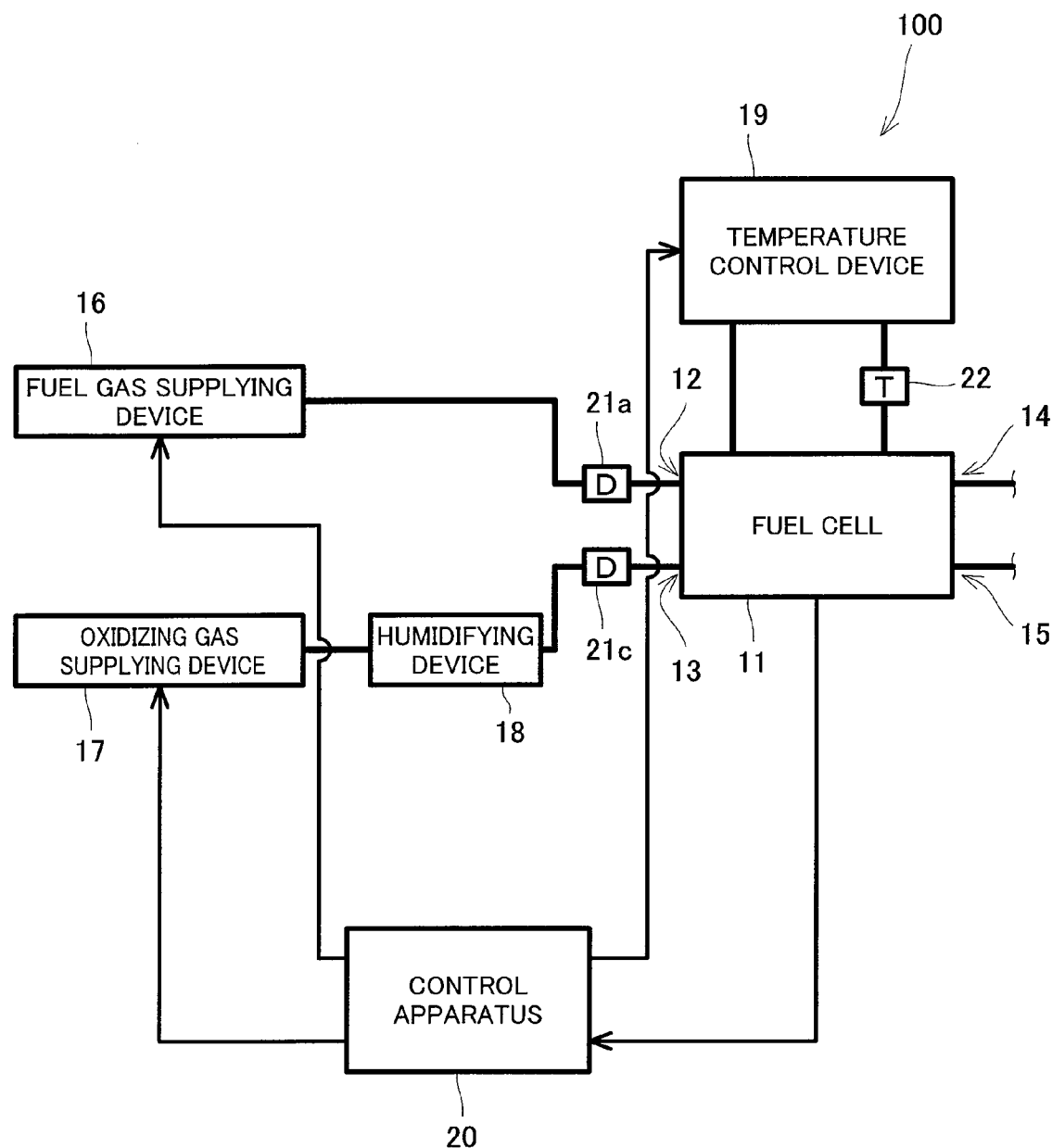
FIG. 2 is a block diagram schematically showing the configuration of the fuel cell system according to Embodiment 1 of the present invention.

FIG. 2 is a block diagram schematically showing the configuration of the fuel cell system according to Embodiment 1 of the present invention. Note that FIG. 2 shows only the components necessary for explaining the present invention, and the other components are omitted.

As shown in FIG. 2, a fuel cell system 100 according to Embodiment 1 of the present invention includes a fuel cell 11 as a main body of its electric power generating section. The fuel cell 11 is supplied with the fuel gas and the oxidizing gas and generates electric power. Moreover, the fuel cell system 100 includes a fuel gas supplying device 16 which generates the fuel gas to be supplied to the fuel cell 11, an oxidizing gas supplying device 17 which generates the oxidizing gas to be supplied to the fuel cell 11, a humidifying device 18 which humidifies the oxidizing gas to be supplied from the oxidizing gas supplying device 17 to the fuel cell 11, a dew point sensor 21a which detects a dew point temperature (hereinafter simply referred to as "dew point") of the fuel gas supplied from the fuel gas supplying device 16, and a dew point sensor 21c which detects the dew point of the oxidizing gas supplied from the humidifying device 18. Moreover, the fuel cell system 100 includes a temperature control device 19 which controls the temperature of the fuel cell 11 by a cooling medium at the time of the electric power generation carried out using the supplied fuel gas and the supplied oxidizing gas and a temperature sensor 22 which detects the temperature of the cooling medium circulating between the temperature control device 19 and the fuel cell 11. Further, the fuel cell system 100 includes a control apparatus 20 which suitably controls operations of the fuel cell 11, the fuel gas supplying device 16, the oxidizing gas supplying device 17 and the temperature control device 19.

More specifically, as shown in FIG. 2, the fuel cell 11 includes a fuel gas supplying portion 12, an oxidizing gas supplying portion 13, a fuel gas discharging portion 14 and an oxidizing gas discharging portion 15. At the time of the electric power generating operation of the fuel cell system 100, after the dew point of the fuel gas generated by the fuel gas supplying device 16 is detected by the dew point sensor 21a, the fuel gas is supplied to the fuel gas supplying portion 12 of the fuel cell 11. Then, the excess fuel gas in the fuel cell 11 is discharged from the fuel gas discharging portion 14 of the fuel cell 11. Moreover, after the oxidizing gas supplied from the oxidizing gas supplying device 17 is humidified by the humidifying device 18, and the dew point of the oxidizing gas is detected by the dew point sensor 21c, the oxidizing gas is supplied to the oxidizing gas supplying portion 13 of the fuel cell 11. Then, the excess oxidizing gas in the fuel cell 11 is discharged from the oxidizing gas discharging portion 15 of the fuel cell 11.

The fuel gas supplying device 16 generates the hydrogen-rich fuel gas by the steam-reforming reaction using a material, such as city gas or propane gas. The fuel gas is humidified at the time of the steam-reforming reaction, and the fuel gas containing moisture is supplied to the fuel cell 11. As above, since the fuel gas containing moisture is supplied from the fuel gas supplying device 16 to the fuel cell 11, the polymer electrolyte membrane (not shown in FIG. 2) of the fuel cell 11 is maintained in a wet state. Although not exemplified in the present embodiment, in the case of using, as the fuel gas, pure hydrogen filled in a hydrogen tank, a humidifier is disposed between the fuel gas supplying device 16 and the dew point sensor 21a to humidify the pure hydrogen.

The oxidizing gas supplying device 17 takes in the air as the oxidizing gas from the atmosphere by, for example, a sirocco fan. Then, the taken air is supplied to the fuel cell 11. Usually, the air taken in from the atmosphere does not contain moisture required to wet the polymer electrolyte membrane of the fuel cell 11. For this reason, as shown in FIG. 2, in the fuel cell system 100, the humidifying device 18 is disposed between the oxidizing gas supplying device 17 and the dew point sensor 21c. The humidifying device 18 humidifies the air discharged from the oxidizing gas supplying device 17, and then supplies the humidified air to the fuel cell 11. Again, since the air humidified by the humidifying device 18 is supplied from the oxidizing gas supplying device 17 to the fuel cell 11, the polymer electrolyte membrane of the fuel cell 11 is maintained in a wet state.

The dew point sensor 21a detects the dew point of the fuel gas supplied from the fuel gas supplying device 16 to the fuel cell 11. Moreover, the dew point sensor 21c detects the dew point of the oxidizing gas supplied from the oxidizing gas supplying device 17 to the fuel cell 11. In the present embodiment, the dew point of the fuel gas detected by the dew point sensor 21a and the dew point of the oxidizing gas detected by the dew point sensor 21c are regarded as the dew point Tda of the fuel gas in the fuel cell 11 and the dew point Tdc of the oxidizing gas in the fuel cell 11, respectively. As the dew point sensor 21a or the dew point sensor 21c, any dew point sensor can be used as long as it has a fuel gas resistance, an oxidizing gas resistance and a temperature resistance. Moreover, the dew point Tda of the fuel gas depends on the performance of the fuel gas supplying device 16 (to be precise, a reformer included in the fuel gas supplying device 16), and the dew point Tdc of the oxidizing gas depends on the performance of the humidifying device 18. Therefore, a dew point calculated based on an operating condition of the reformer may be used as the dew point Tda of the fuel gas, and a dew point calculated based on an operating condition of the humidifying device 18 or the temperature (actual measurement value) of the humidifying device 18 may be used as the dew point Tdc of the oxidizing gas. Note that a mode of detecting the dew point Tda of the fuel gas and the dew point Tdc of the oxidizing gas without using the dew point sensors 21a and 21c will be explained later in detail.

The temperature control device 19 includes, for example, a circulating pump which causes the cooling medium to circulate, and a radiator (cooling fin, heat exchanger, etc.) which causes the circulating cooling medium to radiate heat. The temperature control device 19 supplies to the fuel cell 11 the cooling medium including, for example, water, and recovers from the fuel cell 11 the cooling medium which is increased in temperature by being heated by the heat generated in the electric power generation. After the temperature control device 19 cools down the cooling medium which has been increased in temperature, it supplies the cooling medium to the fuel cell 11 again. Alternatively, the temperature control device 19 decreases the temperature of the fuel cell 11 by changing at least one of conditions that are the flow rate and temperature of the cooling medium. For example, the temperature of the fuel cell 11 can be decreased by increasing the flow rate of the cooling medium in the temperature control device 19. Moreover, by decreasing the temperature of the cooling medium, the temperature of the fuel cell 11 can be decreased. Thus, the temperature control device 19 can maintain the temperature of the fuel cell 11 at constant temperature. Note that the heat energy recovered from the fuel cell 11 by the cooling medium is used for, for example, hot water supply.

The temperature sensor 22 detects the temperature of the cooling medium discharged from the fuel cell 11 to the temperature control device 19. In the present embodiment, the temperature of the cooling medium detected by the temperature sensor 22 is regarded as the temperature Tcell of the fuel cell 11. Note that the temperature Tcell of the fuel cell 11 is the highest temperature in the fuel cell 11. Examples of a method for detecting the temperature Tcell are a method for measuring the temperature of the cooling medium to be supplied to the fuel cell 11, a method for directly measuring by a thermocouple the temperature of the separator (not shown in FIG. 2) constituting the fuel cell 11, and a method for measuring the temperature of the cooling medium discharged from the fuel cell 11. Meanwhile, a highest-temperature portion of the fuel cell 11 is considered to be a cooling medium outlet portion of the fuel cell 11 since a heat exchange takes place between the cooling medium supplied from an inlet and the fuel cell 11, and the cooling medium is discharged from the outlet. Therefore, in the present embodiment, the temperature of the cooling medium discharged from the fuel cell 11 to the temperature control device 19 is detected by the temperature sensor 22.

Note that the low humidification operating condition may be such an operating condition that, for example, Temperature of Cooling Medium Inlet Portion of Fuel Cell 11≦Tda<Temperature (Tcell) of Cooling Medium Outlet Portion of Fuel Cell 11 and Temperature of Cooling Medium Inlet Portion of Fuel Cell 11≦Tdc<Temperature (Tcell) of Cooling Medium Outlet Port of Fuel Cell 11 are satisfied. The effects of the present invention can be obtained even if, as in this case, at least part of the inner portion of the fuel cell is under the low humidification operating condition.

Moreover, the low humidification operating condition may be such an operating condition that, for example, Tda<Temperature of Cooling Medium Inlet Portion of Fuel Cell 11 and Tdc<Temperature of Cooling Medium Inlet Portion of Fuel Cell 11 are satisfied. In this case, the substantially entire inner portion of the fuel cell is under the low humidification operating condition, so that the effects of the present invention can be obtained more significantly.

In accordance with the foregoing, the low humidification operating condition may be such an operating condition that, for example, Temperature of Cooling Medium Inlet Portion of Fuel Cell 11≦Tda<Temperature (Tcell) of Cooling Medium Outlet Portion of Fuel Cell 11 and Tdc<Temperature of Cooling Medium Inlet Portion of Fuel Cell 11 are satisfied. Moreover, the low humidification operating condition may be such an operating condition that, for example, Tda<Temperature of Cooling Medium Inlet Portion of Fuel Cell 11 and Temperature of Cooling Medium Inlet Portion of Fuel Cell 11≦Tdc<Temperature (Tcell) Cooling Medium Outlet Portion of Fuel Cell 11 are satisfied. The effects of the present invention can be obtained even if, as in this case, at least part of the inner portion of the fuel cell is under the low humidification operating condition.

Moreover, the control apparatus 20 suitably controls operations of at least the fuel cell 11, the fuel gas supplying device 16, the oxidizing gas supplying device 17 and the temperature control device 19. The control apparatus 20 includes, for example, an MPU and a memory, and suitably controls operations of at least the fuel cell 11, the fuel gas supplying device 16, the oxidizing gas supplying device 17 and the temperature control device 19 based on data pre-stored in the memory.

Next, an operation of the fuel cell system according to Embodiment 1 of the present invention will be explained with reference to FIGS. 2 to 4. Herein, assume that during the electric power generating operation of the fuel cell system, the dew point Tda of the fuel gas and the dew point Tdc of the oxidizing gas satisfy the mutual relationship that is Tda<Tdc.

The operation of the fuel cell system according to the present embodiment is the same as the operation of the conventional fuel cell system except that the polymer electrolyte membrane is humidified before cutting off the electrical connection between the fuel cell operated under the low humidification operating condition and the external load (to be specific, before the fuel cell becomes the open circuit state). Therefore, only the characteristic operation of the fuel cell system according to the present embodiment will be explained below in detail.

Figure 3:
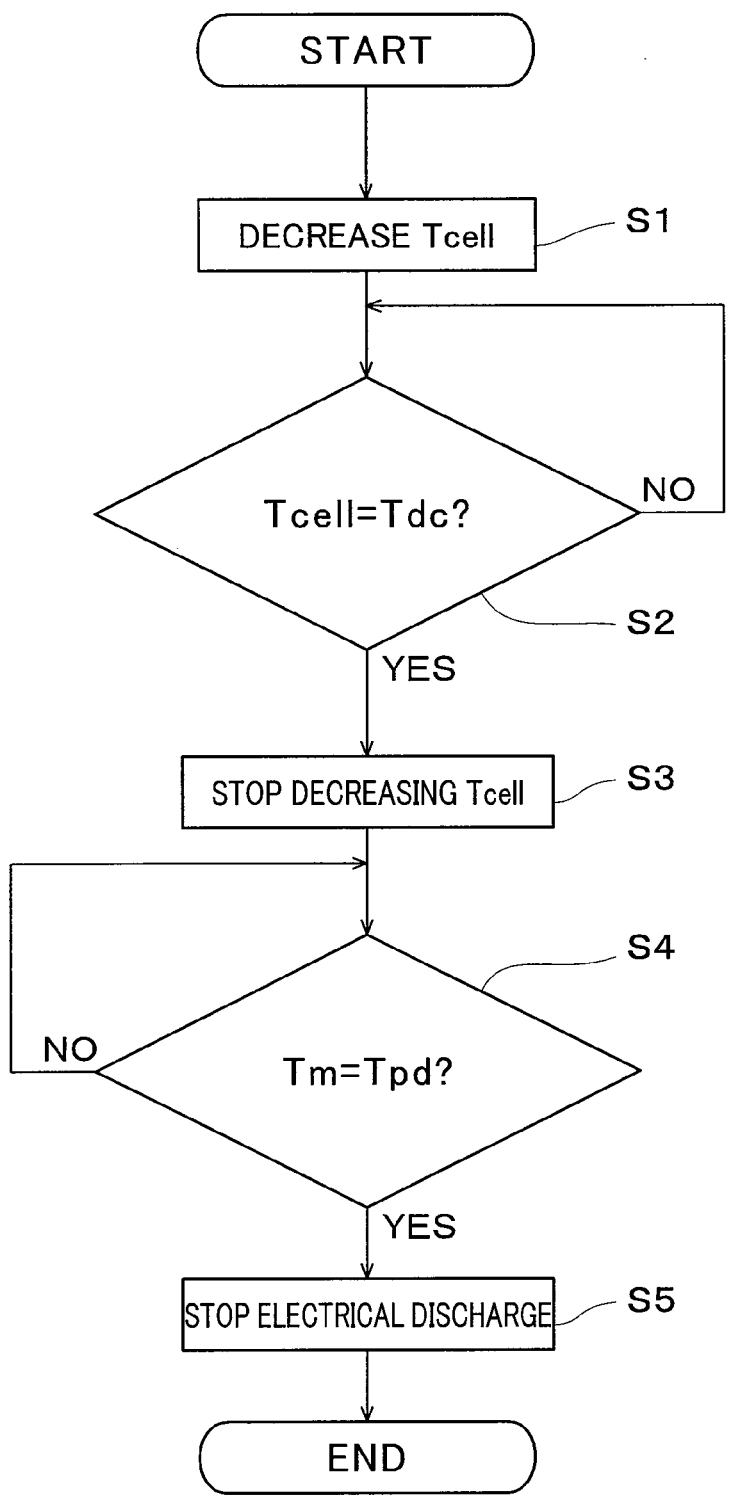
FIG. 3 is a flow chart schematically showing a characteristic operation of the fuel cell system according to Embodiment 1 of the present invention.

FIG. 3 is a flow chart schematically showing the characteristic operation of the fuel cell system according to Embodiment 1 of the present invention. Note that FIG. 3 shows only the steps necessary for explaining the present invention, and the other steps are omitted.

Figure 4:
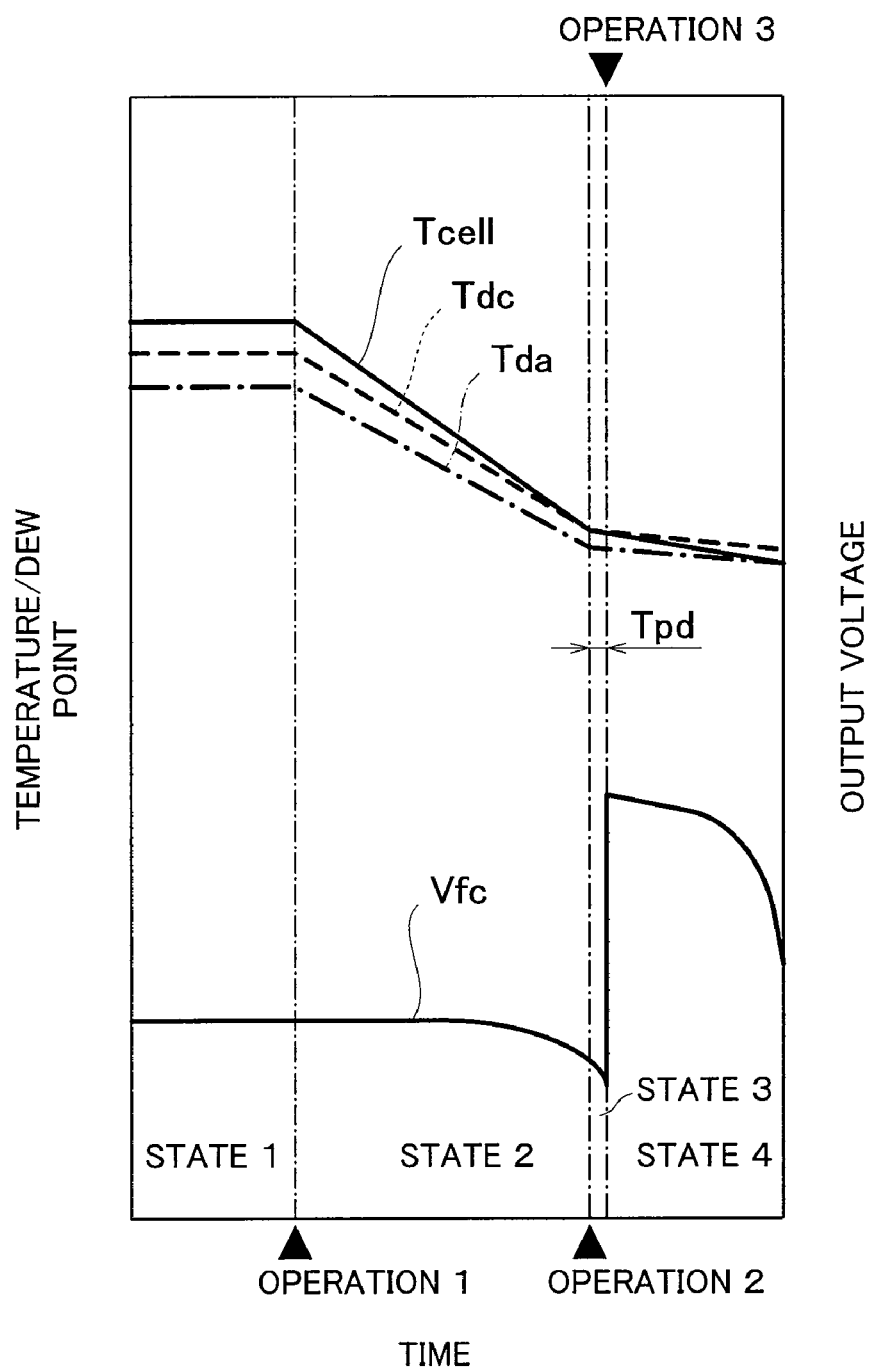
FIG. 4 is a time chart schematically showing changes of a temperature Tcell of a fuel cell, a dew point Tda of a fuel gas, a dew point Tdc of an oxidizing gas and an output voltage Vfc of the fuel cell in the characteristic operation of the fuel cell system according to Embodiment 1 of the present invention.

FIG. 4 is a time chart schematically showing changes of the temperature Tcell of the fuel cell, the dew point Tda of the fuel gas, the dew point Tdc of the oxidizing gas and the output voltage Vfc of the fuel cell in the characteristic operation of the fuel cell system according to Embodiment 1 of the present invention. Note that FIG. 4 shows only the operations necessary for explaining the present invention, and the other operations are omitted.

When stopping the electric power generating operation of the fuel cell system 100, the control apparatus 20 decreases, by controlling the operation of the temperature control device 19 (Operation 1 shown in FIG. 4), the temperature Tcell of the fuel cell 11 (in State 1 shown in FIG. 4) operated under the low humidification operating condition satisfying the mutual relationships that are Tcell>Tda and Tcell>Tdc, until the temperature Tcell of the fuel cell 11 becomes equal to the dew point Tdc of the oxidizing gas (Step S1, and State 2 shown in FIG. 4). In State 2 shown in FIG. 4, the control apparatus 20 continues an electrical discharge of the fuel cell 11 without cutting off the electrical connection between the fuel cell 11 and the external load.

Next, while continuing the electrical discharge of the fuel cell 11, the control apparatus 20 determines whether or not the temperature Tcell of the fuel cell 11 has become equal to the dew point Tdc of the oxidizing gas, based on output signals from the dew point sensor 21c and the temperature sensor 22 (Step S2).

In Step S2, if it is determined that the temperature Tcell of the fuel cell 11 is not equal to the dew point Tdc of the oxidizing gas (NO in Step S2), the control apparatus 20 continues the operation shown in Step S1 while continuing the electrical discharge of the fuel cell 11, until the temperature Tcell of the fuel cell 11 becomes equal to the dew point Tdc of the oxidizing gas. On the other hand, in Step S2, if it is determined that the temperature Tcell of the fuel cell 11 has become equal to the dew point Tdc of the oxidizing gas (YES in Step S2), the control apparatus 20 stops the cooling operation of the temperature control device 19 while continuing the electrical discharge of the fuel cell 11 (Step S3, and Operation 2 shown in FIG. 4), and maintains the operating state of the fuel cell system 100 until a measurement time Tm reaches a predetermined time Tpd (Step S4, and State 3 shown in FIG. 4). In State 3 shown in FIG. 4, the polymer electrolyte membrane of the fuel cell 11 is adequately humidified by mainly using the moisture contained in the oxidizing gas to an extent that the polymer electrolyte membrane can be prevented from deteriorating.

Specifically, the control apparatus 20 determines whether or not the measurement time Tm has reached the predetermined time Tpd (Step S4).

In Step S4, if it is determined that the measurement time Tm has not reached the predetermined time Tpd (NO in Step S4), the control apparatus 20 further maintains the operating state of the fuel cell system 100 while continuing the electrical discharge of the fuel cell 11, until the measurement time Tm reaches the predetermined time Tpd. On the other hand, in Step S4, if it is determined that the measurement time Tm has reached the predetermined time Tpd (YES in Step S4), the control apparatus 20 cuts off the electrical connection between the fuel cell 11 and the external load (Operation 3 shown in FIG. 4) and stops the electrical discharge of the fuel cell 11 (Step S5), thus realizing the open circuit state of the fuel cell 11 (State 4 shown in FIG. 4).

In State 4 shown in FIG. 4, although the output voltage Vfc of the fuel cell 11 increases as shown in FIG. 4 by realizing the open circuit state, the wet state of the polymer electrolyte membrane of the fuel cell 11 is more than the wet state of the polymer electrolyte membrane during the electric power generating operation.

Then, the control apparatus 20 stops the operations of the fuel gas supplying device 16 and the oxidizing gas supplying device 17. Moreover, in order to prevent the polymer electrolyte membrane from drying, for example, the humidified inactive gas is filled into the fuel cell 11. Then, the control apparatus 20 stops all the operations associated with the electric power generating operation of the fuel cell system 100.

As above, in the present embodiment, when stopping the electric power generating operation of the fuel cell 11 operated under the low humidification operating condition satisfying the mutual relationships that are Tcell>Tda and Tcell>Tdc, the control apparatus 20 decreases the temperature Tcell of the fuel cell 11, continues the electrical discharge of the fuel cell 11 until the temperature Tcell of the fuel cell 11 becomes equal to the dew point Tdc of the oxidizing gas, and stops the electrical discharge to the external load after the temperature Tcell of the fuel cell 11 has become equal to the dew point Tdc of the oxidizing gas. With this, since the mutual relationship that is Tcell≦Tdc is realized in such a state that the fuel cell 11 is in the open circuit state in which the fuel cell 11 stops the electrical discharge to the external load, and the polymer electrolyte membrane is adequately humidified, the deterioration of the polymer electrolyte membrane can be suppressed, and the durability of the fuel cell 11 can be adequately secured.

Next, a modification example of the operation of the fuel cell system according to Embodiment 1 of the present invention will be explained with reference to FIGS. 2, 3 and 5.

The modification example of the operation of the fuel cell system according to Embodiment 1 of the present invention is different from the operation of the above-described fuel cell system only in that the electrical discharge of the fuel cell is stopped after the condition of Tcell=Tda is satisfied instead of the condition of Tcell=Tdc. To be specific, a flow chart according to the present modification example is obtained by modifying the flow chart of FIG. 3 such that in Step S2, whether or not the condition of Tcell=Tda is satisfied is determined.

Figure 5:
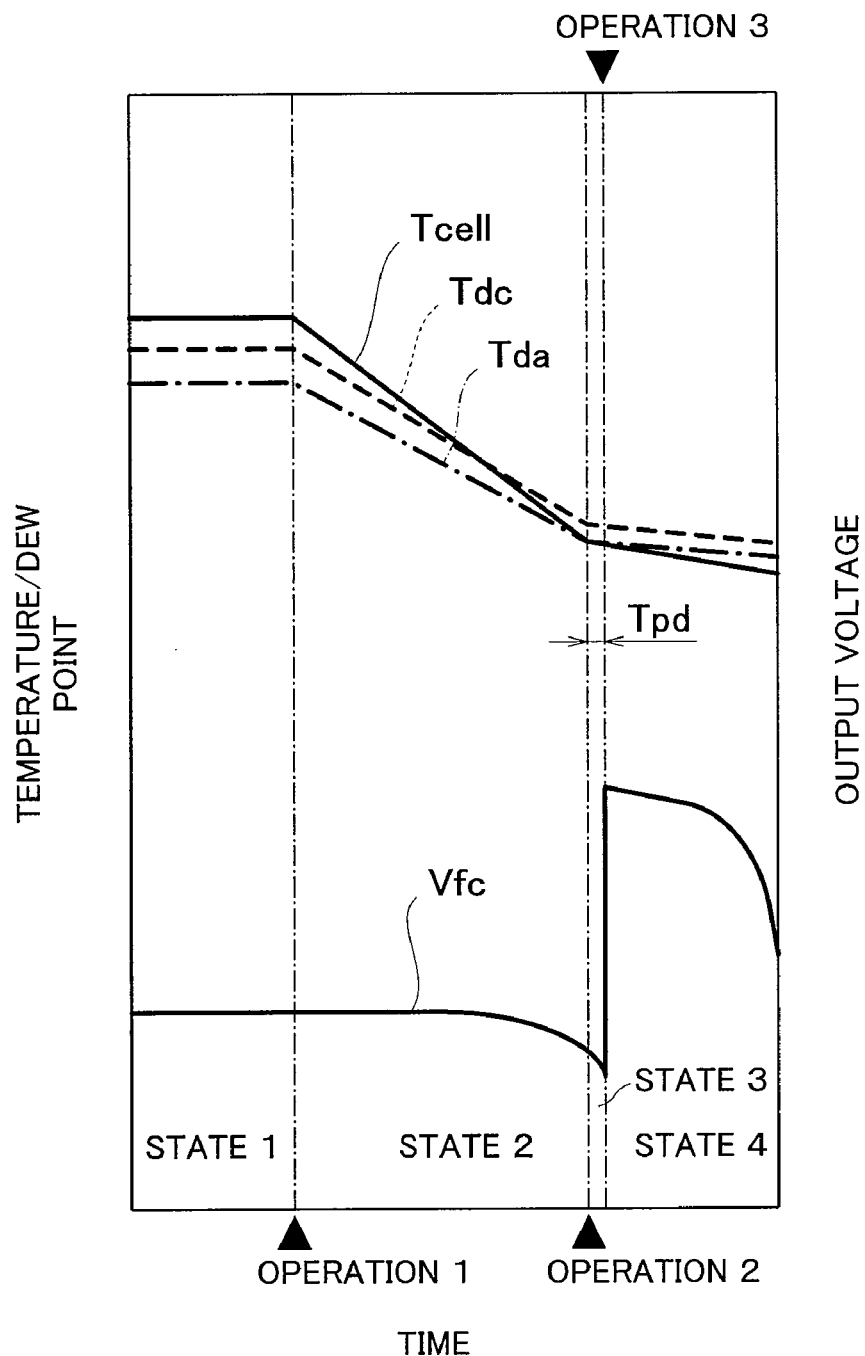
FIG. 5 is a time chart schematically showing changes of the temperature Tcell of the fuel cell, the dew point Tda of the fuel gas, the dew point Tdc of the oxidizing gas and the output voltage Vfc of the fuel cell in a modification example of the characteristic operation of the fuel cell system according to Embodiment 1 of the present invention.

FIG. 5 is a time chart schematically showing changes of the temperature Tcell of the fuel cell, the dew point Tda of the fuel gas, the dew point Tdc of the oxidizing gas and the output voltage Vfc of the fuel cell in the modification example of the characteristic operation of the fuel cell system according to Embodiment 1 of the present invention.

When stopping the electric power generating operation of the fuel cell system 100, the control apparatus 20 decreases, by controlling the operation of the temperature control device 19 (Operation 1 shown in FIG. 5), the temperature Tcell of the fuel cell 11 (in State 1 shown in FIG. 5) operated under the low humidification operating condition, until the temperature Tcell of the fuel cell 11 becomes equal to the dew point Tda of the fuel gas (Step S1, and State 2 shown in FIG. 5). In State 2 shown in FIG. 5, the control apparatus 20 continues the electrical discharge of the fuel cell 11 without cutting off the electrical connection between the fuel cell 11 and the external load.

Next, while continuing the electrical discharge of the fuel cell 11, the control apparatus 20 determines whether or not the temperature Tcell of the fuel cell 11 has become equal to the dew point Tda of the fuel gas, based on output signals from the dew point sensor 21a and the temperature sensor 22 (Step S2). If it is determined that the temperature Tcell of the fuel cell 11 has become equal to the dew point Tda of the fuel gas (YES in Step S2), the control apparatus 20 stops the cooling operation of the temperature control device 19 while continuing the electrical discharge of the fuel cell 11 (Step S3, and Operation 2 shown in FIG. 5), and maintains the operating state of the fuel cell system 100 until the measurement time Tm reaches the predetermined time Tpd (Step S4, and State 3 shown in FIG. 5).

Specifically, the control apparatus 20 determines whether or not the measurement time Tm has reached the predetermined time Tpd (Step S4). If it is determined that the measurement time Tm has reached the predetermined time Tpd (YES in Step S4), the control apparatus 20 cuts off the electrical connection between the fuel cell 11 and the external load (Operation 3 shown in FIG. 5) and stops the electrical discharge of the fuel cell 11 (Step S5), thus realizing the open circuit state of the fuel cell 11 (State 4 shown in FIG. 5).

As above, in the present modification example, when stopping the electric power generating operation of the fuel cell 11 operated under the low humidification operating condition, the control apparatus 20 decreases the temperature Tcell of the fuel cell 11, continues the electrical discharge of the fuel cell 11 until the temperature Tcell of the fuel cell 11 becomes equal to the dew point Tda of the fuel gas, and stops the electrical discharge to the external load after the temperature Tcell of the fuel cell 11 has become equal to the dew point Tda of the fuel gas. With this, since the mutual relationship that is Tcell≦Tda<Tdc is realized in such a state that the fuel cell 11 is in the open circuit state in which the fuel cell 11 stops the electrical discharge to the external load, and the polymer electrolyte membrane is further humidified, the deterioration of the polymer electrolyte membrane can be suppressed more effectively.

The present embodiment explained the mode of stopping the electric power generating operation by actually measuring the temperature Tcell of the fuel cell 11 and the dew point Tdc of the oxidizing gas (or the dew point Tda of the fuel gas) by the dew point sensor 21c (or the dew point sensor 21a) and the temperature sensor 22. However, the present embodiment is not limited to this mode, and a mode of stopping the electric power generating operation based on a time chart showing the relationship between Tcell and Tdc (or Tda) measured in advance may be realized. Even in such a mode, the same effects as the present embodiment can be obtained.

Moreover, the present embodiment explained the mode of cutting off the electrical connection between the fuel cell 11 and the external load after the measurement time Tm has reached the predetermined time Tpd. However, the present embodiment is not limited to this mode, and a mode of cutting off the electrical connection between the fuel cell 11 and the external load immediately after the temperature Tcell of the fuel cell 11 has become equal to at least one of the dew point Tda of the fuel gas and the dew point Tdc of the oxidizing gas may be realized. Even in such a mode, the same effects as the present embodiment can be obtained.

Moreover, the present embodiment assumes that the dew point Tda of the fuel gas and the dew point Tdc of the oxidizing gas satisfy the mutual relationship that is Tda<Tdc during the electric power generating operation of the fuel cell system 100. However, the present embodiment is not limited to this mutual relationship, and the mutual relationship that is Tda>Tdc or Tda=Tdc may be satisfied. In a case where the dew point Tda of the fuel gas and the dew point Tdc of the oxidizing gas satisfy the mutual relationship that is Tda>Tdc, the deterioration of the polymer electrolyte membrane can be suppressed by causing the temperature Tcell of the fuel cell 11 to be equal to the dew point Tda of the fuel gas, and the deterioration of the polymer electrolyte membrane can be suppressed more effectively by causing the temperature Tcell of the fuel cell 11 to be equal to the dew point Tdc of the oxidizing gas. Moreover, in a case where the dew point Tda of the fuel gas and the dew point Tdc of the oxidizing gas satisfy the mutual relationship that is Tda=Tdc, the deterioration of the polymer electrolyte membrane can be suppressed by causing the temperature Tcell of the fuel cell 11 to be equal to the dew point Tda of the fuel gas and the dew point Tdc of the oxidizing gas. That is, the present invention is realized by causing the temperature Tcell of the fuel cell 11 to be equal to at least one of the dew point Tda of the fuel gas and the dew point Tdc of the oxidizing gas.

Embodiment 2

The configuration of a fuel cell system according to Embodiment 2 of the present invention is the same as the configuration of the fuel cell system according to Embodiment 1 shown in FIGS. 1 and 2. Therefore, explanations of the configuration of the fuel cell system according to the present embodiment are omitted herein.

An operation of the fuel cell system according to Embodiment 2 of the present invention will be explained with reference to FIGS. 2, 6 and 7.

Figure 6:
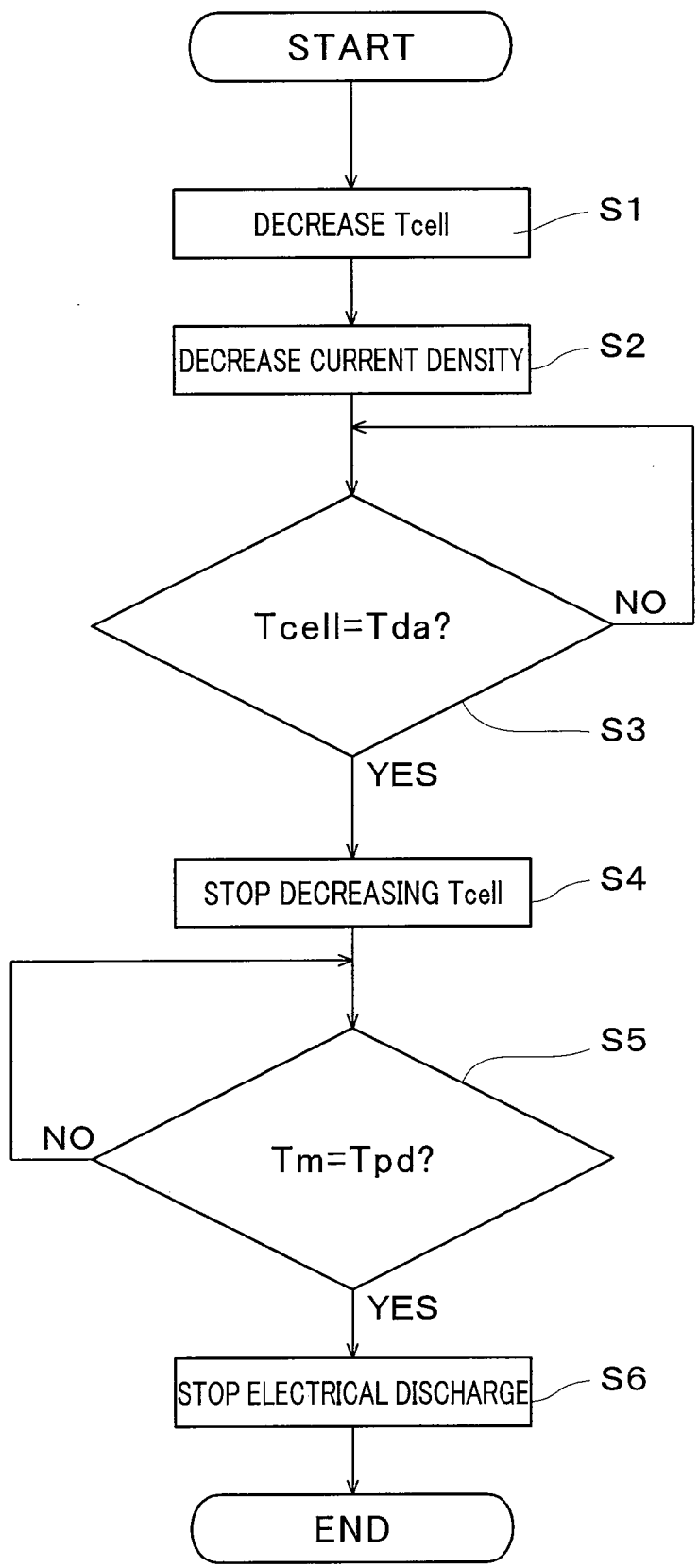
FIG. 6 is a flow chart schematically showing the characteristic operation of the fuel cell system according to Embodiment 2 of the present invention.

FIG. 6 is a flow chart schematically showing the characteristic operation of the fuel cell system according to Embodiment 2 of the present invention.

Figure 7:
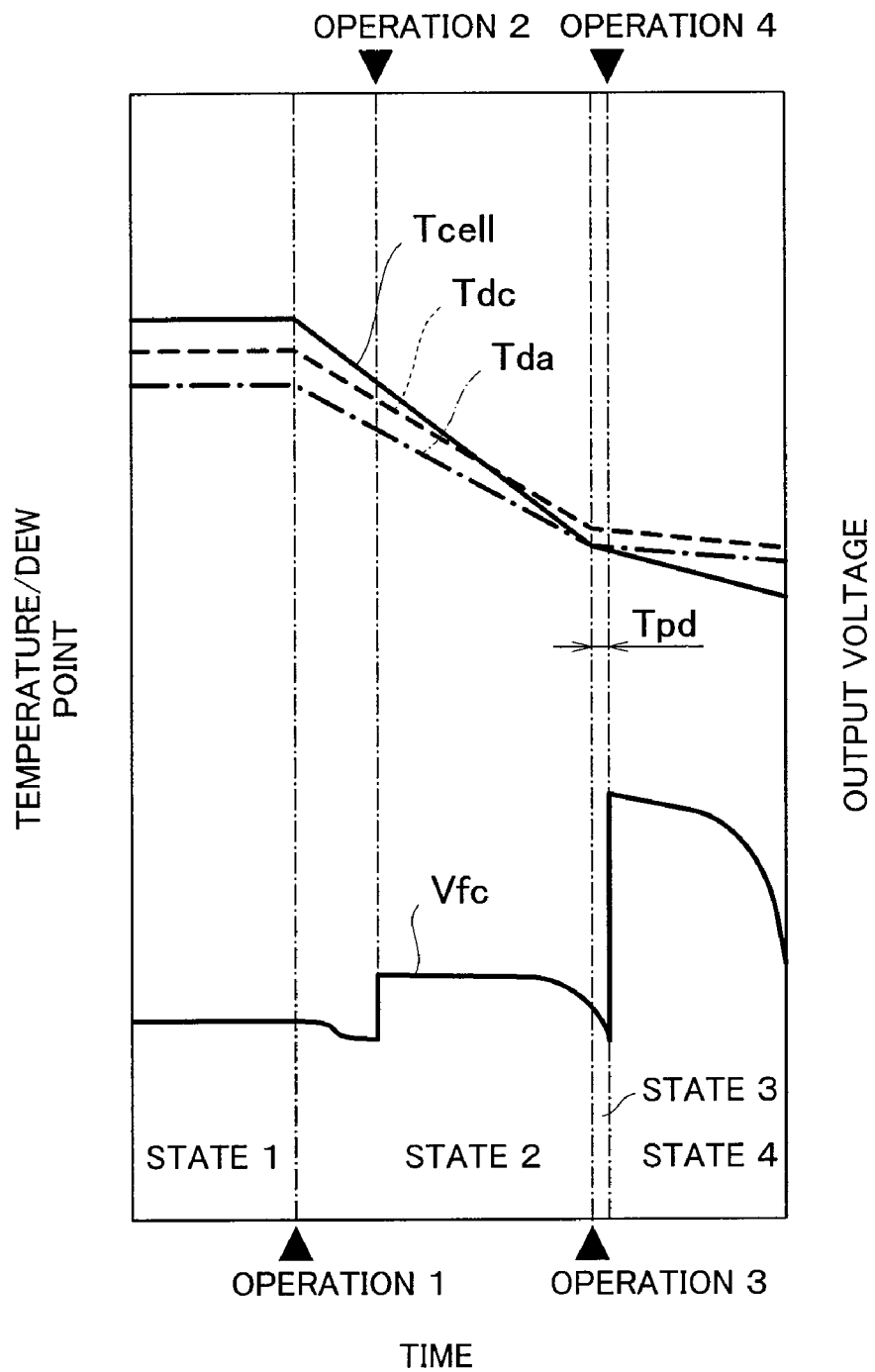
FIG. 7 is a time chart schematically showing changes of the temperature Tcell of the fuel cell, the dew point Tda of the fuel gas, the dew point Tdc of the oxidizing gas and the output voltage Vfc of the fuel cell in the characteristic operation of the fuel cell system according to Embodiment 2 of the present invention.

FIG. 7 is a time chart schematically showing changes of the temperature Tcell of the fuel cell, the dew point Tda of the fuel gas, the dew point Tdc of the oxidizing gas and the output voltage Vfc of the fuel cell in the characteristic operation of the fuel cell system according to Embodiment 2 of the present invention.

When stopping the electric power generating operation of the fuel cell system 100, the control apparatus 20 decreases, by controlling the operation of the temperature control device 19 (Operation 1 shown in FIG. 7), the temperature Tcell of the fuel cell 11 (in State 1 shown in FIG. 7) operated under the low humidification operating condition, until the temperature Tcell of the fuel cell 11 becomes equal to the dew point Tda of the fuel gas (Step S1, and State 2 shown in FIG. 7). In State 2 shown in FIG. 7, the control apparatus 20 decreases an output current density at the time of the electrical discharge of the fuel cell 11 such that the output current density is equal to or lower than an output current density at the time of the electrical discharge in State 1 described above (Step S2, and Operation 2 shown in FIG. 7). By Operation 2 shown in FIG. 7, the output voltage Vfc of the fuel cell 11 increases, and the amount of water generated in the electric power generation in the fuel cell 11.

Next, the control apparatus 20 determines whether or not the temperature Tcell of the fuel cell 11 has become equal to the dew point Tda of the fuel gas, based on the output signals from the dew point sensor 21a and the temperature sensor 22 (Step S3). If it is determined that the temperature Tcell of the fuel cell 11 has become equal to the dew point Tda of the fuel gas (YES in Step S3), the control apparatus 20 stops the cooling operation of the temperature control device 19 (Step S4, and Operation 3 shown in FIG. 7), and maintains the operating state of the fuel cell system 100 until the measurement time Tm reaches the predetermined time Tpd (State 3 shown in FIG. 7). In State 3 shown in FIG. 7, the polymer electrolyte membrane of the fuel cell 11 is adequately humidified by using the moisture contained in the fuel gas and the oxidizing gas.

Next, the control apparatus 20 determines whether or not the measurement time Tm has reached the predetermined time Tpd (Step S5). If it is determined that the measurement time Tm has reached the predetermined time Tpd (YES in Step S5), the control apparatus 20 cuts off the electrical connection between the fuel cell 11 and the external load and stops the electrical discharge (Step S6, and Operation 4 shown in FIG. 7), thus realizing the open circuit state of the fuel cell 11 (State 4 shown in FIG. 7).

After the control apparatus 20 stops the operations of the fuel gas supplying device 16 and the oxidizing gas supplying device 17, it carries out the above-described predetermined action to prevent the polymer electrolyte membrane from drying, and stops all the operations concerning the electric power generating operation of the fuel cell system 100.

As above, in the present embodiment, when stopping the electric power generating operation of the fuel cell 11 operated under the low humidification operating condition, the control apparatus 20 decreases the temperature Tcell of the fuel cell 11, and stops the electrical discharge to the external load after the temperature Tcell of the fuel cell 11 has become equal to the dew point Tda of the fuel gas. Moreover, when the control apparatus 20 is decreasing the temperature Tcell of the fuel cell 11, it decreases an output current density at the time of the electrical discharge of the fuel cell 11 such that the output current density is equal to or lower than an output current density at the time of the electric power generating operation. Thus, since the amount of water generated when decreasing the temperature Tcell of the fuel cell 11 can be decreased, it is possible to effectively suppress water clogging of the passage caused by flooding which may occur when decreasing the temperature Tcell of the fuel cell 11.

Moreover, in the fuel cell system, normally, reaction resistances in the anode and the cathode increase as the temperature of the fuel cell decreases. To be specific, in the fuel cell system, if the temperature of the fuel cell is decreased in such a state that the output current density at the time of the electrical discharge is maintained constant, so-called polarity inversion occurs, that is, the output voltage of the fuel cell becomes equal to or lower than 0 volt. If the polarity inversion occurs, the electric power generating performance of the fuel cell deteriorates significantly. However, in the present embodiment, when decreasing the temperature Tcell of the fuel cell 11, the output current density of the fuel cell 11 at the time of the electrical discharge is decreased so as to be equal to or lower than the output current density at the time of the electric power generating operation. Therefore, it is possible to effectively suppress the occurrence of the polarity inversion of the fuel cell 11. Thus, it is possible to prevent the electric power generating performance of the fuel cell 11 from deteriorating.

The other configurations are the same as those in Embodiment 1.

Embodiment 3

First, the configuration of a fuel cell system according to Embodiment 3 of the present invention will be explained with reference to FIG. 8.

The configuration of the fuel cell system according to Embodiment 3 of the present invention is the same as the configuration of the fuel cell system according to Embodiment 1 shown in FIGS. 1 and 2 except that a dew point control device is included instead of the humidifying device 18 shown in FIG. 2. Therefore, the difference between the configuration of the fuel cell system according to the present embodiment and the configuration of the fuel cell system according to Embodiment 1 will be explained herein, and explanations of common portions therebetween are omitted.

Figure 8:
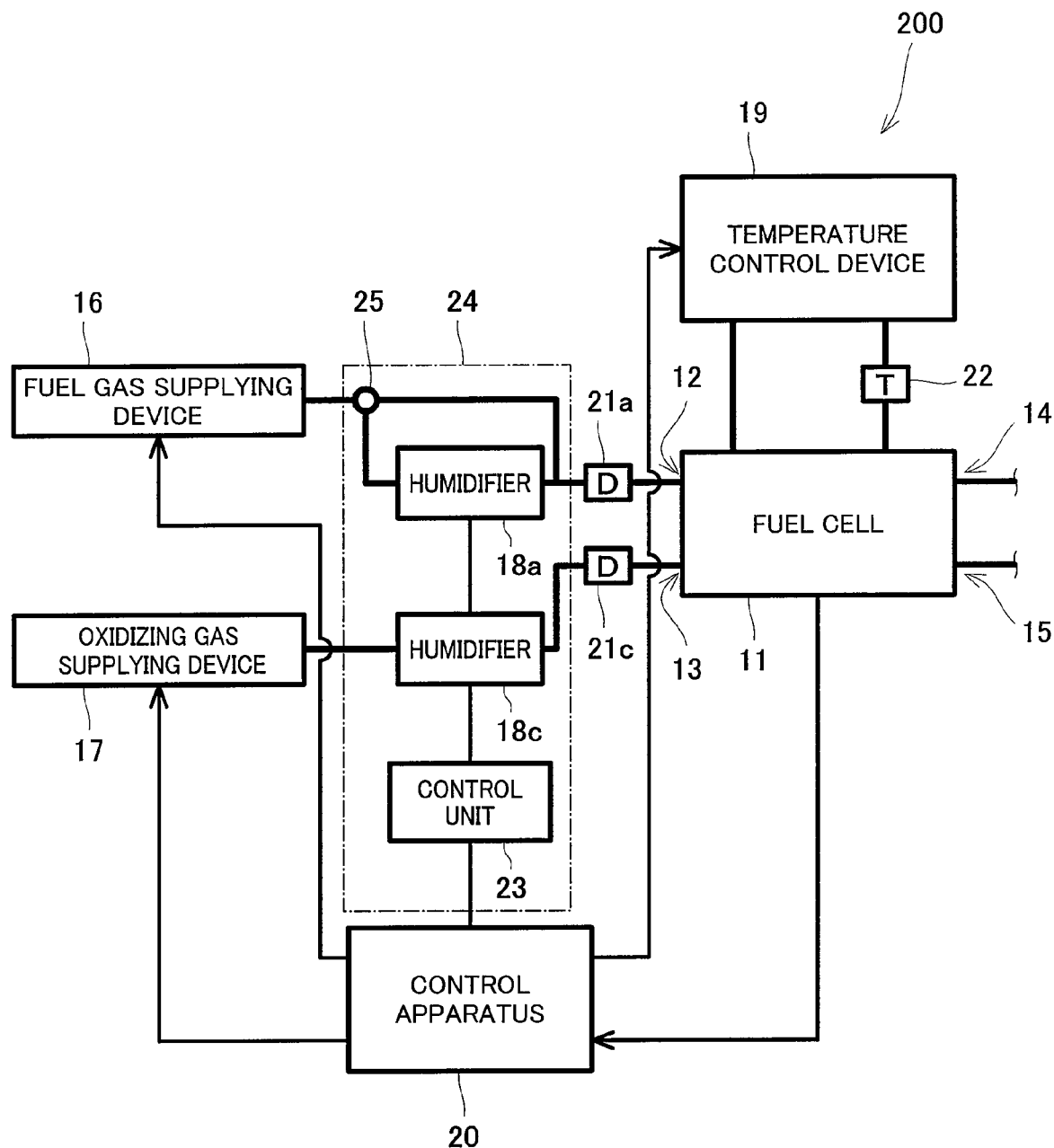
FIG. 8 is a block diagram schematically showing the configuration of the fuel cell system according to Embodiment 3 of the present invention.

FIG. 8 is a block diagram schematically showing the configuration of the fuel cell system according to Embodiment 3 of the present invention. Note that FIG. 8 shows only the components necessary for explaining the present invention, and the other components are omitted.

As shown in FIG. 8, a fuel cell system 200 according to Embodiment 3 of the present invention includes a dew point control device 24. The dew point control device 24 controls the dew point of the fuel gas supplied from the fuel gas supplying device 16 and the dew point of the oxidizing gas supplied from the oxidizing gas supplying device 17 according to need. The dew point of the fuel gas and the dew point of the oxidizing gas are actually controlled by humidifiers 18a and 18c included in the dew point control device 24. Operations of the humidifiers 18a and 18c are controlled by a control unit 23 included in the dew point control device 24. As with the fuel cell system 100 according to Embodiment 1, the fuel gas and the oxidizing gas each of whose dew point has been controlled pass through detection points of the dew point sensors 21a and 21c, and then are supplied to the fuel cell 11. Note that the operation of the control unit 23 is controlled by the control apparatus 20 of the fuel cell system 200.

As shown in FIG. 8, the dew point control device 24 includes a three-way valve 25. In a case where it is unnecessary to adjust the dew point of the fuel gas supplied from the fuel gas supplying device 16, the three-way valve 25 operates so as to directly supply the fuel gas to the dew point sensor 21a without supplying to the humidifier 18a.

Next, an operation of the fuel cell system according to Embodiment 3 of the present invention will be explained with reference to FIGS. 8 to 10. Herein, assume that during the electric power generating operation of the fuel cell system, the dew point Tda of the fuel gas and the dew point Tdc of the oxidizing gas satisfy the mutual relationship that is Tda<Tdc.

Figure 9:
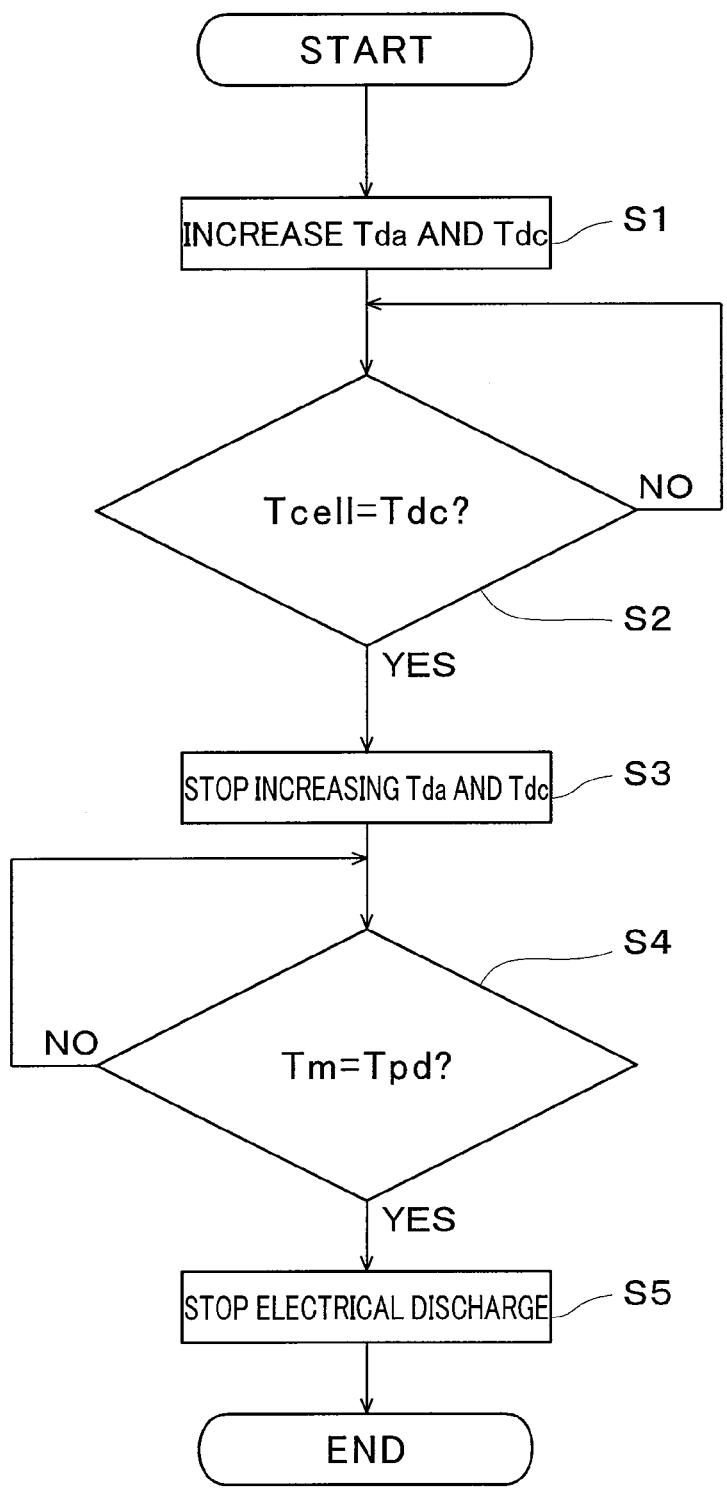
FIG. 9 is a flow chart schematically showing the characteristic operation of the fuel cell system according to Embodiment 3 of the present invention.

FIG. 9 is a flow chart schematically showing the characteristic operation of the fuel cell system according to Embodiment 3 of the present invention. Note that FIG. 9 shows only the steps necessary for explaining the present invention, and explanations of the other steps are omitted.

Figure 10:
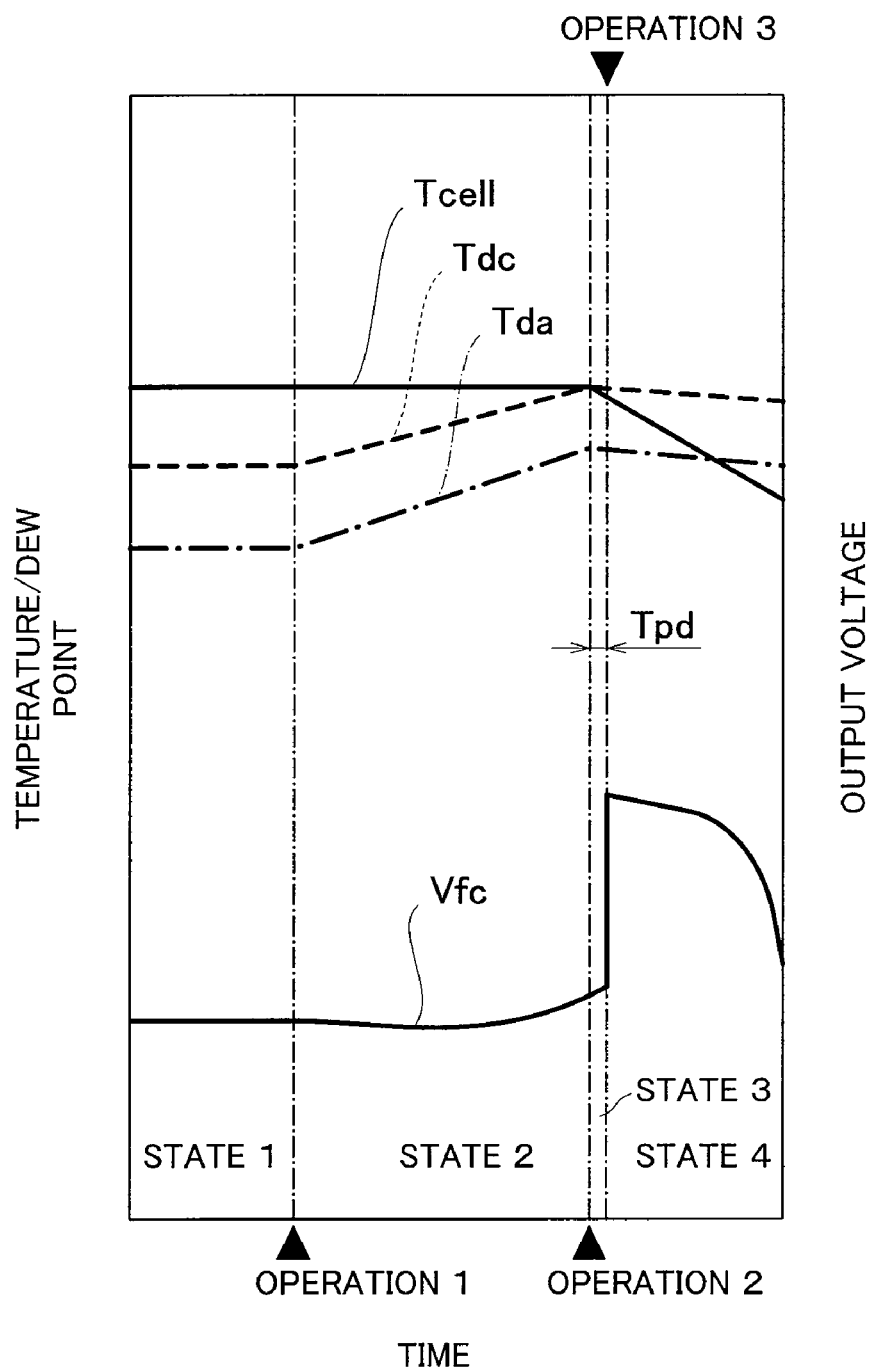
FIG. 10 is a time chart schematically showing changes of the temperature Tcell of the fuel cell, the dew point Tda of the fuel gas, the dew point Tdc of the oxidizing gas and the output voltage Vfc of the fuel cell in the characteristic operation of the fuel cell system according to Embodiment 3 of the present invention.

FIG. 10 is a time chart schematically showing changes of the temperature Tcell of the fuel cell, the dew point Tda of the fuel gas, the dew point Tdc of the oxidizing gas and the output voltage Vfc of the fuel cell in the characteristic operation of the fuel cell system according to Embodiment 3 of the present invention. Note that FIG. 10 shows only the operations necessary for explaining the present invention, and explanations of the other operations are omitted.

When stopping the electric power generating operation of the fuel cell system 200, first, by controlling the operation of the dew point control device 24 (Operation 1 shown in FIG. 10) in such a state that the fuel cell 11 is operated under the low humidification operating condition satisfying the mutual relationships that are Tcell>Tda and Tcell>Tdc (State 1 shown in FIG. 10), the control apparatus 20 increases the dew point Tda of the fuel gas and the dew point Tdc of the oxidizing gas until the dew point Tdc of the oxidizing gas becomes equal to the temperature Tcell of the fuel cell 11 (Step S1, and State 2 shown in FIG. 10). In State 2 shown in FIG. 10, the control apparatus 20 continues the electrical discharge of the fuel cell 11 without cutting off the electrical connection between the fuel cell 11 and the external load.

Next, while continuing the electrical discharge of the fuel cell 11, the control apparatus 20 determines whether or not the dew point Tdc of the oxidizing gas has become equal to the temperature Tcell of the fuel cell 11, based on the output signals from the dew point sensor 21c and the temperature sensor 22 (Step S2).

Specifically, in Step S2, if it is determined that the dew point Tdc of the oxidizing gas is not equal to the temperature Tcell of the fuel cell 11 (NO in Step S2), the control apparatus 20 continues the operation shown in Step S1 of FIG. 9 while continuing the electric discharge of the fuel cell 11, until the dew point Tdc of the oxidizing gas becomes equal to the temperature Tcell of the fuel cell 11. Meanwhile, in Step S2, if it is determined that the dew point Tdc of the oxidizing gas has become equal to the temperature Tcell of the fuel cell 11 (YES in Step S2), the control apparatus 20 causes the dew point control device 24 to stop the increase of the dew points Tda and Tdc while continuing the electrical discharge of the fuel cell 11 (Step S3, and Operation 2 shown in FIG. 10), and maintains the operating state of the fuel cell system 200 until the measurement time Tm reaches the predetermined time Tpd (Step S4, and State 3 shown in FIG. 10). In State 3 shown in FIG. 10, the polymer electrolyte membrane of the fuel cell 11 is adequately humidified by mainly using the moisture contained in the oxidizing gas such that the polymer electrolyte membrane can be prevented from deteriorating.

Specifically, the control apparatus 20 determines whether or not the measurement time Tm has reached the predetermined time Tpd (Step S4).

In Step S4, if it is determined that the measurement time Tm has not reached the predetermined time Tpd (NO in Step S4), the control apparatus 20 further maintains the operating state of the fuel cell system 200 while continuing the electrical discharge of the fuel cell 11, until the measurement time Tm reaches the predetermined time Tpd. Meanwhile, in Step S4, if it is determined that the measurement time Tm has reached the predetermined time Tpd (YES in Step S4), the control apparatus 20 cuts off the electrical connection between the fuel cell 11 and the external load (Operation 3 shown in FIG. 10) and stops the electrical discharge of the fuel cell 11 (Step S5), thus realizing the open circuit state of the fuel cell 11 (State 4 shown in FIG. 10).

Then, the control apparatus 20 stops the operations of the fuel gas supplying device 16 and the oxidizing gas supplying device 17. Moreover, as with Embodiment 1, in order to prevent the polymer electrolyte membrane from drying, the humidified inactive gas is filled into the fuel cell 11. Then, the control apparatus 20 stops all the operations concerning the electric power generating operation of the fuel cell system 200.

As above, in the present embodiment, when stopping the electric power generating operation of the fuel cell 11 operated under the low humidification operating condition satisfying the mutual relationships that are Tcell>Tda and Tcell>Tdc, the control apparatus 20 increases the dew point Tda of the fuel gas and the dew point Tdc of the oxidizing gas, continues the electrical discharge of the fuel cell 11 until the dew point Tdc of the oxidizing gas becomes equal to the temperature Tcell of the fuel cell 11, and stops the electrical discharge to the external load after the dew point Tdc of the oxidizing gas has become equal to the temperature Tcell of the fuel cell 11. With this, since the mutual relationship that is Tcell≦Tdc is realized in such a state that the fuel cell 11 is in the open circuit state in which the fuel cell 11 stops the electrical discharge to the external load, and the polymer electrolyte membrane is adequately humidified, the durability of the fuel cell 11 can be adequately secured.

Next, a modification example of the operation of the fuel cell system according to Embodiment 3 of the present invention will be explained with reference to FIGS. 8, 9 and 11.

The modification example of the operation of the fuel cell system according to Embodiment 3 of the present invention is different from the operation of the above-described fuel cell system only in that the electrical discharge of the fuel cell is stopped after Tcell=Tda is satisfied instead of Tcell=Tdc. To be specific, a flow chart according to the present modification example is obtained by modifying the flow chart of FIG. 9 such that in Step S2, whether or not the condition of Tcell=Tda is satisfied is determined.

Figure 11:
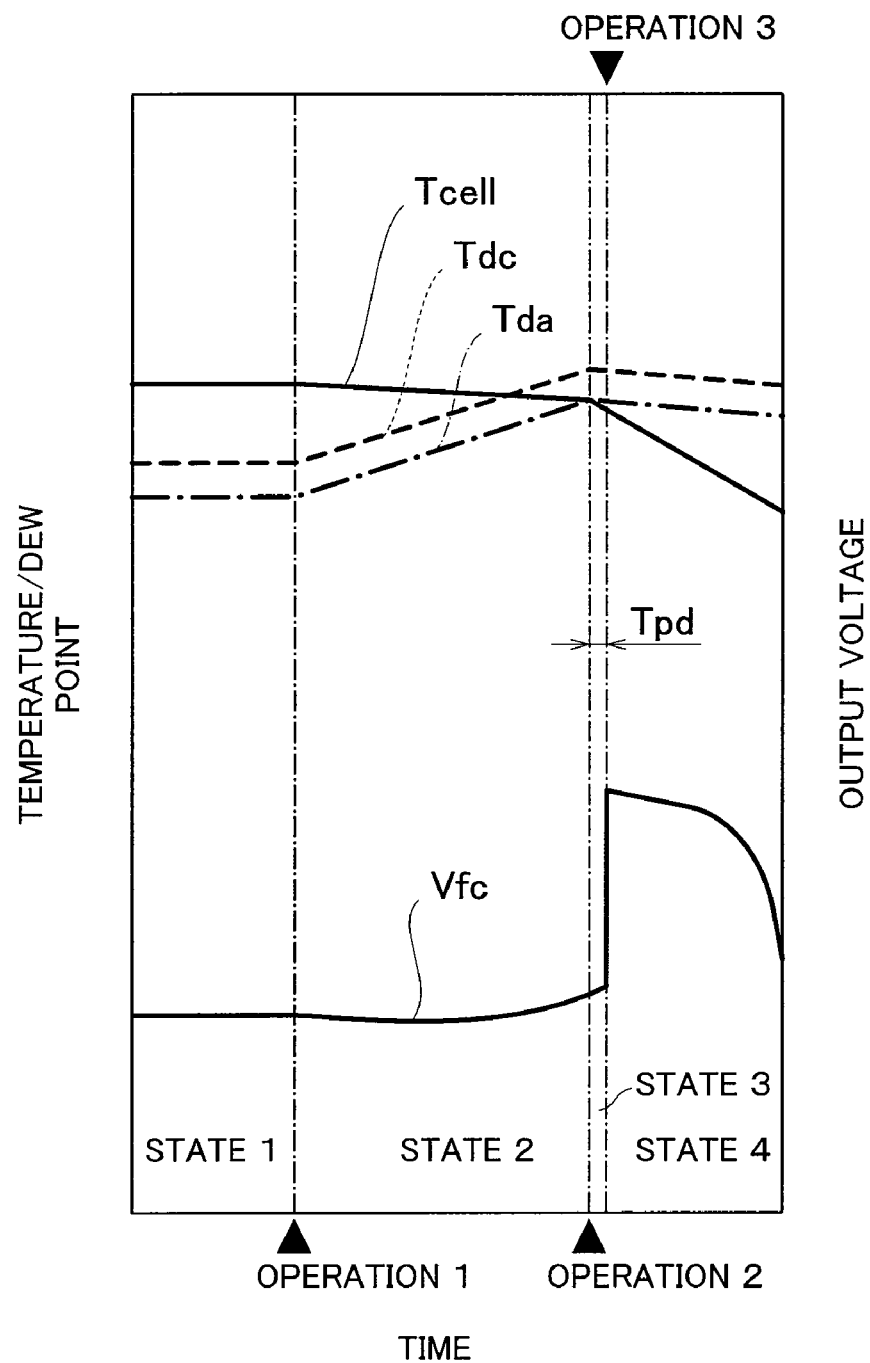
FIG. 11 is a time chart schematically showing changes of the temperature Tcell of the fuel cell, the dew point Tda of the fuel gas, the dew point Tdc of the oxidizing gas and the output voltage Vfc of the fuel cell in the modification example of the characteristic operation of the fuel cell system according to Embodiment 3 of the present invention.

FIG. 11 is a time chart schematically showing changes of the temperature Tcell of the fuel cell, the dew point Tda of the fuel gas, the dew point Tdc of the oxidizing gas and the output voltage Vfc of the fuel cell in the modification example of the characteristic operation of the fuel cell system according to Embodiment 3 of the present invention.

When stopping the electric power generating operation of the fuel cell system 200, by controlling the operation of the dew point control device 24 (Operation 1 shown in FIG. 11) in such a state that the fuel cell 11 is operated under the low humidification operating condition (State 1 shown in FIG. 11), the control apparatus 20 increases the dew point Tda of the fuel gas and the dew point Tdc of the oxidizing gas until the dew point Tda of the fuel gas becomes equal to the temperature Tcell of the fuel cell 11 (Step S1, and State 2 shown in FIG. 11). In State 2 shown in FIG. 11, the control apparatus 20 continues the electrical discharge of the fuel cell 11 without cutting off the electrical connection between the fuel cell 11 and the external load.

Next, while continuing the electrical discharge of the fuel cell 11, the control apparatus 20 determines whether or not the dew point Tda of the fuel gas has become equal to the temperature Tcell of the fuel cell 11, based on the output signals from the dew point sensor 21a and the temperature sensor 22 (Step S2). If it is determined that the dew point Tda of the fuel gas has become equal to the temperature Tcell of the fuel cell 11 (YES in Step S2), the control apparatus 20 causes the dew point control device 24 to stop the increases of the dew points Tda and Tdc while continuing the electrical discharge of the fuel cell 11 (Step S3, and Operation 2 shown in FIG. 11), and maintains the operating state of the fuel cell system 200 until the measurement time Tm reaches the predetermined time Tpd (Step S4, and State 3 shown in FIG. 11).

Specifically, the control apparatus 20 determines whether or not the measurement time Tm has reached the predetermined time Tpd (Step S4). If it is determined that the measurement time Tm has reached the predetermined time Tpd (YES in Step S4), the control apparatus 20 cuts off the electrical connection between the fuel cell 11 and the external load (Operation 3 shown in FIG. 11) and stops the electrical discharge of the fuel cell 11 (Step S5), thus realizing the open circuit state of the fuel cell 11 (State 4 shown in FIG. 11).

As above, in the present modification example, when stopping the electric power generating operation of the fuel cell 11 operated under the low humidification operating condition, the control apparatus 20 increases the dew point Tda of the fuel gas and the dew point Tdc of the oxidizing gas, continues the electrical discharge of the fuel cell 11 until the dew point Tda of the fuel gas becomes equal to the temperature Tcell of the fuel cell 11, and stops the electrical discharge to the external load after the dew point Tda of the fuel gas has become equal to the temperature Tcell of the fuel cell 11. With this, since the mutual relationship that is Tcell≦Tda<Tdc is realized in such a state that the fuel cell 11 is in the open circuit state in which the fuel cell 11 stops the electrical discharge to the external load, and the polymer electrolyte membrane is further humidified, the deterioration of the polymer electrolyte membrane can be suppressed more effectively.

That is, the present embodiment can obtain the same effects as Embodiment 1 by causing at least one of the dew point Tda of the fuel gas and the dew point Tdc of the oxidizing gas to be equal to the temperature Tcell of the fuel cell 11.

The present embodiment explained the mode of increasing both the dew point Tda of the fuel gas and the dew point Tdc of the oxidizing gas when stopping the electric power generating operation of the fuel cell system 200. However, the present embodiment is not limited to this mode, and a mode of increasing at least one of the dew point Tda of the fuel gas and the dew point Tdc of the oxidizing gas may be realized. For example, in the case of increasing only the dew point Tdc of the oxidizing gas, by controlling the three-way valve 25, the control apparatus 20 directly supplies to the dew point sensor 21a the fuel gas supplied from the fuel gas supplying device 16. Moreover, in the case of increasing only the dew point Tda of the fuel gas, by controlling the operation of the humidifier 18c by controlling the control unit 23, the control apparatus 20 supplies the oxidizing gas, supplied from the oxidizing gas supplying device 17, to the dew point sensor 21c without adjusting the dew point of the oxidizing gas. Even in such a mode, the same effects as the present embodiment can be obtained.

Moreover, the present embodiment was explained assuming such a mode that at least one of the dew point Tda of the fuel gas and the dew point Tdc of the oxidizing gas is controlled by controlling the temperature of the humidifier included in the dew point control device 24 by an external electric power, such as commercial electric power. However, the present embodiment is not limited to this mode. For example, a mode of controlling at least one of the dew point Tda of the fuel gas and the dew point Tdc of the oxidizing gas by controlling the temperature of the humidifier of the dew point control device 24 by changing at least one of conditions that are the flow rate and temperature of the fuel gas supplied from the fuel gas supplying device 16 to the fuel cell 11 may be realized. Similarly, a mode of controlling at least one of the dew point Tda of the fuel gas and the dew point Tdc of the oxidizing gas by controlling the temperature of the humidifier of the dew point control device 24 by changing at least one of conditions that are the flow rate and temperature of the oxidizing gas supplied from the oxidizing gas supplying device 17 to the fuel cell 11 may be realized. Moreover, a mode of changing at least one of conditions that are the flow rate and temperature of the fuel gas and the flow rate and temperature of the oxidizing gas may be realized. Even in such modes, the same effect as the present embodiment can be obtained.

The other configurations are the same as those in Embodiments 1 to 2.

As above, in accordance with the present invention, when the fuel cell system operated under the low humidification operating condition stops the electric power generating operation, the polymer electrolyte membrane of the fuel cell is adequately humidified before cutting off the electrical connection with the external load and realizing the open circuit state. Therefore, it is possible to solve such a problem that the electric power generating performance of the fuel cell deteriorates with time. With this, it is possible to provide a fuel cell system which has an excellent durability capable of preventing the polymer electrolyte membrane from deteriorating when the polymer electrolyte fuel cell operated under the low humidification operating condition shifts to the open circuit state, and to provide an operating method thereof.

Each of Embodiments 1 to 3 explained the mode in which before cutting off the electrical connection between the fuel cell and the load, the control apparatus controls one of the temperature control device and the dew point control device so that the temperature of the fuel cell becomes equal to at least one of the dew points of the fuel gas and the oxidizing gas. However, the present embodiment is not limited to this mode. For example, a mode in which before cutting off the electrical connection between the fuel cell and the load, the control apparatus controls both the temperature control device and the dew point control device so that the temperature of the fuel cell becomes equal to at least one of the dew points of the fuel gas and the oxidizing gas may be realized. With this mode, it is possible to significantly shorten a wait time that elapses until the temperature of the fuel cell becomes equal to at least one of the dew points of the fuel gas and the oxidizing gas.

Moreover, in the mode in which the control apparatus controls the temperature control device so that the temperature of the fuel cell becomes equal to at least one of the dew points of the fuel gas and the oxidizing gas, it is desirable that the dew point of the fuel gas and the dew point of the oxidizing gas do not change with time. With this mode, it is possible to shorten the wait time that elapses until the temperature of the fuel cell becomes equal to at least one of the dew points of the fuel gas and the oxidizing gas. As the humidifier of the dew point control device, a bubbler can be used. The bubbler is a humidifier which carries out humidification by causing the fuel gas or the oxidizing gas to pass through hot water. In the bubbler, the fuel gas or the oxidizing gas is humidified so as to have the dew point that is equal to the temperature of the hot water. As a heat source for driving the bubbler, it is possible to use the cooling medium which cools down the fuel cell, a heater, or a combustion exhaust gas of the reformer. By using the bubbler as the humidifier of the dew point control device, it becomes easy to maintain the dew point of the fuel gas constant, and it also becomes easy to maintain the dew point of the oxidizing gas constant. Thus, with a comparatively simple configuration, it becomes easy to shorten the wait time that elapses until the temperature of the fuel cell becomes equal to at least one of the dew points of the fuel gas and the oxidizing gas.

Incidentally, Embodiments 1 to 3 explained in detail the basic configurations and characteristic operations of the fuel cell systems 100 and 200 according to the present invention.

Specifically, each of Embodiments 1 to 3 explained the mode of detecting the dew point of the fuel gas or the dew point of the oxidizing gas by the dew point sensor 21a or the dew point sensor 21c. Moreover, Embodiments 1 to 3 explained the mode of causing the temperature of the fuel cell 11 to be equal to at least one of the dew points of the fuel gas and the oxidizing gas by decreasing the temperature of the fuel cell 11 by the temperature control device 19 and the mode of causing the temperature of the fuel cell 11 to be equal to at least one of the dew points of the fuel gas and the oxidizing gas by increasing the dew points of the fuel gas and the oxidizing gas by the dew point control device 24.

However, by constructing appropriate configurations of the fuel cell systems 100 and 200, the dew point of the fuel gas and the dew point of the oxidizing gas can be detected accurately without disposing the dew point sensor 21a and the dew point sensor 21c. Moreover, by constructing appropriate configurations of the fuel cell systems 100 and 200, the dew point of the fuel gas and the dew point of the oxidizing gas can be increased accurately without disposing the dew point control device 24.

Hereinafter, the other mode for detecting the dew point and the other mode for controlling the dew point which support Embodiment 1 to 3 will be explained.

Embodiment 4

Figure 12:
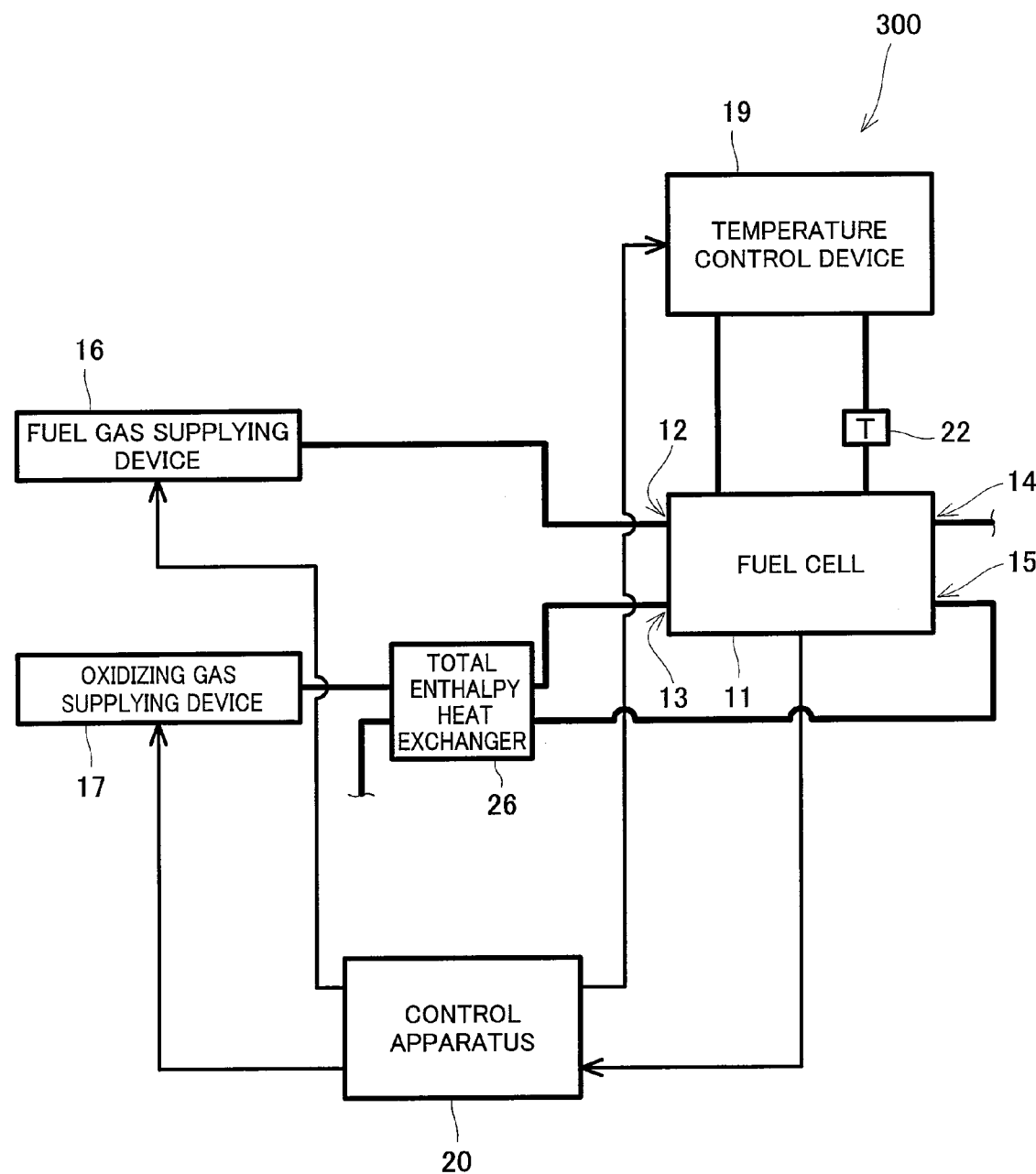
FIG. 12 is a block diagram schematically showing the configuration of the fuel cell system according to Embodiment 4 of the present invention.

FIG. 12 is a block diagram schematically showing the configuration of a fuel cell system according to Embodiment 4 of the present invention. Note that FIG. 12 shows only the components necessary for explaining the present invention, and the other components are omitted.

As shown in FIG. 12, the configuration of a fuel cell system 300 according to the present embodiment is different from the configuration of the fuel cell system 100 according to Embodiment 1 in that the dew point sensors 21a and 21c are not included therein. Moreover, as shown in FIG. 12, the configuration of the fuel cell system 300 according to the present embodiment is different from the configuration of the fuel cell system 100 according to Embodiment 1 in that instead of the humidifying device 18, a total enthalpy heat exchanger 26 is included therein, which humidifies the oxidizing gas, supplied from the oxidizing gas supplying device 17, by utilizing excess oxidizing gas (hereinafter, the excess oxidizing gas is referred to as "discharged oxidizing gas") discharged from the oxidizing gas discharging portion 15 of the fuel cell 11. The other configuration of the fuel cell system 300 is the same as that of the fuel cell system 100 of Embodiment 1.

First, a mode for detecting the dew point Tda of the fuel gas and a mode for controlling the dew point Tda of the fuel gas will be explained.

In the fuel cell system 300 according to the present embodiment, the dew point Tda of the fuel gas supplied to the fuel cell 11 is calculated based on the operating condition of the fuel gas supplying device 16.

More specifically, in the present embodiment, a memory of the control apparatus 20 of the fuel cell system 300 pre-stores a data table showing the relationship among the S/C (steam carbon ratio), the reaction temperature of the steam-reforming reaction and the dew point Tda of the fuel gas. The S/C is preset in the control apparatus 20 according to the operating condition of the fuel cell system 300. Therefore, in accordance with the present embodiment, by detecting the reaction temperature (temperature of the reforming catalyst) of the steam-reforming reaction in the fuel gas supplying device 16 by an existing temperature detecting device, the dew point Tda of the fuel gas can be calculated easily without using the dew point sensor 21a shown in FIG. 1.

Meanwhile, in the fuel cell system 300 according to the present embodiment, by changing the S/C in the fuel gas supplying device 16 considering a conversion ratio, etc., the dew point Tda of the fuel gas supplied to the fuel cell 11 can be controlled arbitrarily.

Figure 13:
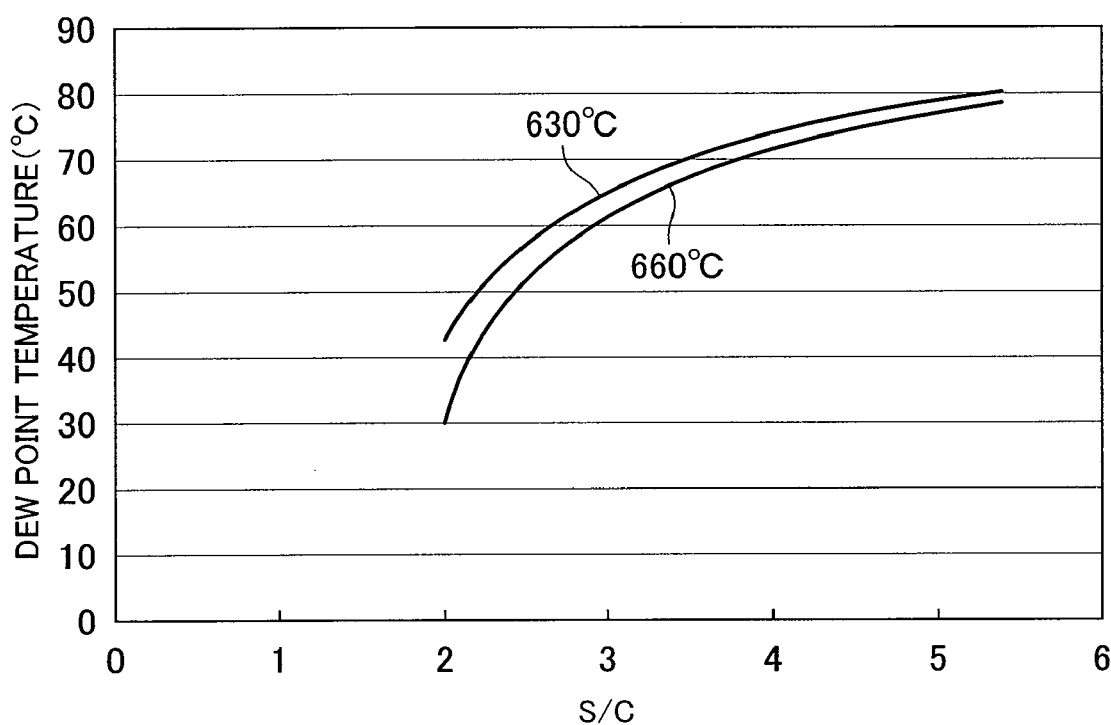
FIG. 13 is a correlation diagram schematically showing a relationship between the dew point of the fuel gas generated in the fuel gas supplying device and an S/C for each reaction temperature of the steam-reforming reaction.

FIG. 13 is a correlation diagram schematically showing a relationship between the dew point of the fuel gas generated in the fuel gas supplying device and the S/C for each reaction temperature of the steam-reforming reaction.

As shown in FIG. 13, the dew point Tda of the fuel gas generated in the fuel gas supplying device 16 can be controlled arbitrarily by changing the S/C in the fuel gas supplying device 16. For example, in a case where the reaction temperature of the steam-reforming reaction is controlled to be 660 degrees C., by setting the S/C in the fuel gas supplying device 16 to be 2, it becomes possible to control the dew point Tda of the fuel gas to be about 30 degrees C., and by setting the S/C in the fuel gas supplying device 16 to be 5, it becomes possible to control the dew point Tda of the fuel gas to be about 77 degrees C. Moreover, in a case where the reaction temperature of the steam-reforming reaction is controlled to be 630 degrees C., by setting the S/C in the fuel gas supplying device 16 to be 2, it becomes possible to control the dew point Tda of the fuel gas to be about 42 degrees C., and by setting the S/C in the fuel gas supplying device 16 to be 5, it becomes possible to control the dew point Tda of the fuel gas to be about 79 degrees C. The control of the S/C in the fuel gas supplying device 16 is appropriately carried out based on the comparison between the dew point Tda of the fuel gas calculated based on the operating condition of the fuel gas supplying device 16 and the temperature Tcell of the fuel cell.

Next, the mode for detecting the dew point Tdc of the oxidizing gas and the mode for controlling the dew point Tdc of the oxidizing gas will be explained.

FIG. 14 is an explanatory diagram schematically showing the configuration for calculating the dew point of the oxidizing gas humidified by the total enthalpy heat exchanger.

As shown in FIGS. 12 and 14, in the present embodiment, in the total enthalpy heat exchanger 26, the total enthalpy heat exchange is carried out between the oxidizing gas supplied from the oxidizing gas supplying device 17 and the discharged oxidizing gas discharged from the oxidizing gas discharging portion 15 of the fuel cell 11. As shown in FIG. 14, P1 denotes a steam amount of the discharged oxidizing gas discharged from the oxidizing gas discharging portion 15 of the fuel cell 11, and P2 denotes a steam amount of the discharged oxidizing gas utilized for humidifying the oxidizing gas in the total enthalpy heat exchanger 26. Moreover, P3 denotes a steam amount of the oxidizing gas supplied from the oxidizing gas supplying device 17, and P4 denotes a steam amount of the oxidizing gas humidified in the total enthalpy heat exchanger 26. Further, W1 denotes the amount of water which has passed through a total enthalpy heat exchange membrane (not shown in FIG. 14) of the total enthalpy heat exchanger 26, and Wg denotes the amount of water generated in the fuel cell 11.

Part of the amount Wg of water generated on the oxidizing gas side of the fuel cell 11 pass through the polymer electrolyte membrane and back diffuse on the fuel gas side. To be specific, an amount (fuel gas side generated water amount) Wga of water added to the fuel gas side in the fuel cell is calculated as the product of Wg and θ (back diffusion ratio), and an amount (oxidizing gas side generated water amount) Wgc of water added to the oxidizing gas side in the fuel cell is calculated as the product of Wg and (1−θ). Although θ (back diffusion ratio) varies depending on the property of the polymer electrolyte membrane used in the fuel cell 11, a constant measured in advance can be used as θ.

In this case, as shown in Formula (1) in FIG. 14, the steam amount P1 is calculated as the sum of the steam amount P4 and the oxidizing gas side generated water amount Wgc. To be specific, as shown in Formula (1), the steam amount P1 is calculated as the sum of the steam amount P3, the passed-through water amount W1, and the product of the generated water amount Wg and (1−θ). Moreover, as shown in Formula (2) in FIG. 14, the steam amount P2 is calculated as the difference between the steam amount P1 and the passed-through water amount W1. To be specific, as shown in Formula (2), the steam amount P2 is calculated as the sum of the steam amount P3 and the oxidizing gas side generated water amount Wgc. Moreover, as shown in Formula (3) of FIG. 14, although, to be exact, the actual measurement value should be used as the steam amount P3, the steam amount P3 is approximated as a constant α on the basis that the saturated steam amount at room temperature is very small. Moreover, as shown in Formula (4) in FIG. 14, the steam amount P4 is calculated as the sum of the steam amount P3 and the passed-through water amount W1. The passed-through water amount W1 is calculated as the product of a constant β (area of the total enthalpy heat exchange membrane of the humidifier), a constant γ (water vapor transmission coefficient), and a logarithmic average water vapor partial pressure difference D. To be specific, as shown in Formula (4), the steam amount P4 is calculated as the sum of the steam amount P3 and the product of the constant β, the constant γ and the logarithmic average water vapor partial pressure difference D.

Therefore, in the fuel cell system 300 according to the present embodiment, the steam amount P4 of the oxidizing gas of the fuel cell 11 is calculated from Formulas (1) to (4), the constant α, and the generated water amount Wg (the generated water amount Wg can be calculated from the operating condition of the fuel cell 11). The generated water amount Wg is calculated using, for example, the area and current density of the polymer electrolyte membrane. In accordance with the present embodiment, the dew point Tdc of the oxidizing gas supplied to the fuel cell 11 can be easily calculated based on the calculated steam amount P4 without using the dew point sensor 21c shown in FIG. 1.

Meanwhile, in the fuel cell system 300 according to the present embodiment, the dew point Tdc of the oxidizing gas supplied to the fuel cell 11 can be controlled as desired by changing the generated water amount Wg in the fuel cell 11 by controlling the current density. Note that the control apparatus 20 can easily control the current density by controlling an inverter connected to the fuel cell 11.

The other configurations are the same as those in Embodiments 1 to 3.

Embodiment 5

Figure 15:
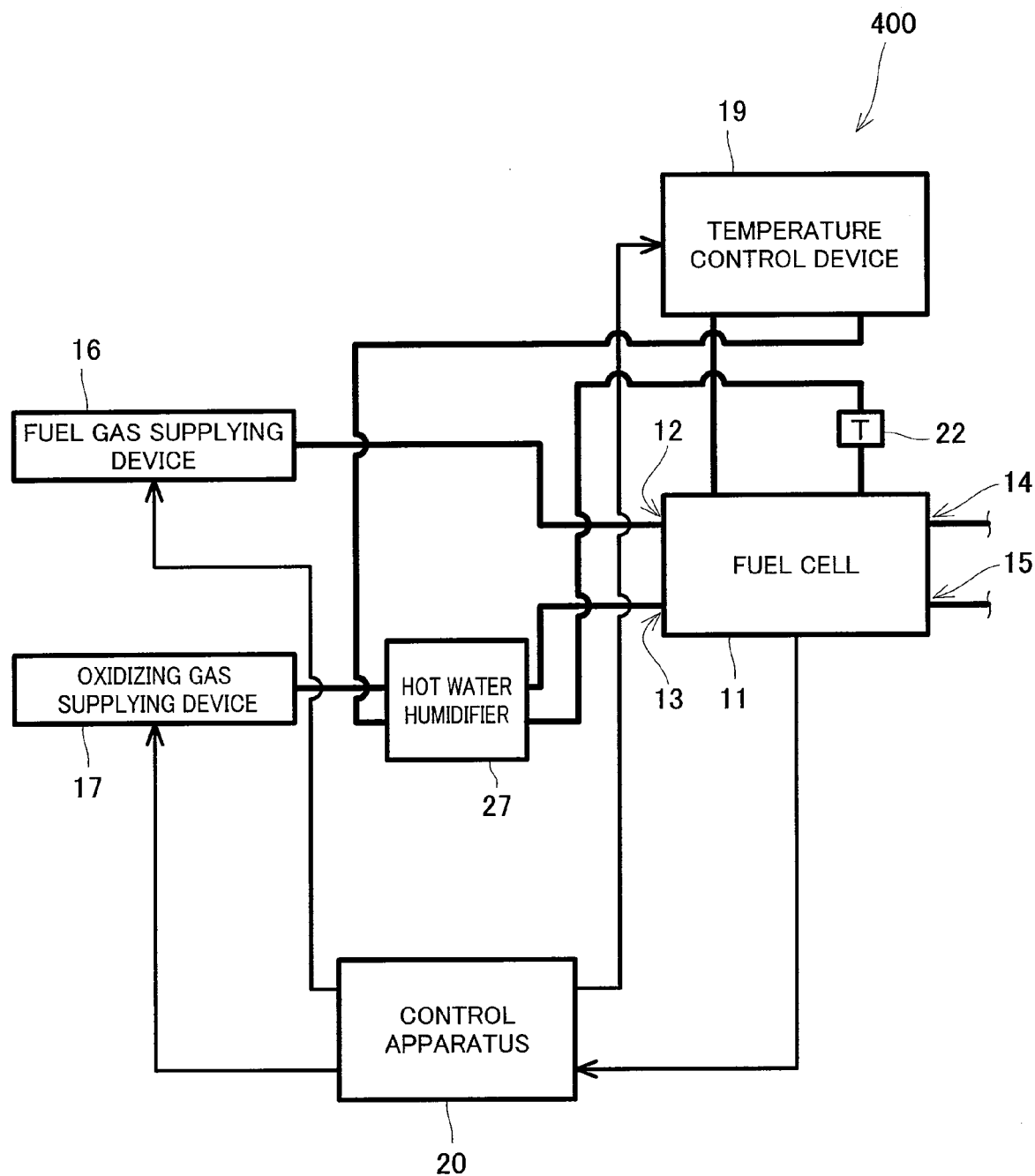
FIG. 15 is a block diagram schematically showing the configuration of the fuel cell system according to Embodiment 5 of the present invention.

FIG. 15 is a block diagram schematically showing the configuration of a fuel cell system according to Embodiment 5 of the present invention. Note that FIG. 15 shows only the components necessary for explaining the present invention, and the other components are omitted.

As shown in FIG. 15, the configuration of a fuel cell system 400 according to the present embodiment is different from the configuration of the fuel cell system 100 of Embodiment 1 in that the dew point sensors 21a and 21c are not included therein. Moreover, as shown in FIG. 15, the configuration of the fuel cell system 400 of the present embodiment is different from the configuration of the fuel cell system 100 of Embodiment 1 in that a hot water humidifier 27 which humidifies the oxidizing gas, supplied from the oxidizing gas supplying device 17, by utilizing a cooling medium (hereinafter referred to as "cooling water") discharged from the fuel cell 11 is included therein instead of the humidifying device 18. The other configuration of the fuel cell system 400 is the same as that of the fuel cell system 100 of Embodiment 1.

In the present embodiment, the mode for detecting the dew point Tda of the fuel gas and the mode for controlling the dew point Tda of the fuel gas are the same as the modes shown in Embodiment 4. Therefore, explanations of the mode for detecting the dew point Tda of the fuel gas and the mode for controlling the dew point Tda of the fuel gas are omitted here.

Hereinafter, the mode for detecting the dew point Tdc of the oxidizing gas and the mode for controlling the dew point Tdc of the oxidizing gas will be explained.

FIG. 16 is an explanatory diagram schematically showing the configuration for calculating the dew point of the oxidizing gas humidified by the hot water humidifier.

As shown in FIGS. 15 and 16, in the present embodiment, in the hot water humidifier 27, the oxidizing gas supplied from the oxidizing gas supplying device 17 is humidified by the cooling water discharged from the fuel cell 11. As shown in FIG. 16, P1 denotes a saturated steam amount at a temperature T1 of the cooling water discharged from the fuel cell 11, and P2 denotes a saturated steam amount at a temperature T2 of the cooling water utilized for humidifying the oxidizing gas in the hot water humidifier 27. Moreover, P3 denotes the steam amount of the oxidizing gas supplied from the oxidizing gas supplying device 17, and P4 denotes the steam amount of the oxidizing gas humidified in the hot water humidifier 27. Further, W1 denotes the amount of water which has passed through a humidifying membrane (not shown in FIG. 16) of the hot water humidifier 27, T1 denotes the temperature of the cooling water at the cooling water outlet of the fuel cell 11, and T2 denotes the temperature of the cooling water at the cooling water inlet of the fuel cell 11.

In this case, as shown in Formulas (1) and (2) in FIG. 16, the steam amount P1 and the steam amount P2 are measurable as a saturated steam amount S1 at the temperature T1 and a saturated steam amount S2 at the temperature T2, respectively. Moreover, as shown in Formula (3) in FIG. 16, although, to be exact, the actual measurement value should be used as the steam amount P3 as with Embodiment 4, the steam amount P3 is approximated as the constant $\alpha$ on the basis that the saturated steam amount at room temperature is very small. Moreover, as shown in Formula (4) in FIG. 16, the steam amount P4 is calculated as the sum of the steam amount P3 and the passed-through water amount W1. As with Embodiment 4, the passed-through water amount W1 is calculated as the product of the constant $\beta$ (area of the total enthalpy heat exchange membrane of the humidifier), the constant $\gamma$ (water vapor transmission coefficient) and the logarithmic average water vapor partial pressure difference D. To be specific, as shown in Formula (4), the steam amount P4 is calculated as the sum of the steam amount P3 and the product of the constant $\beta$, the constant $\gamma$ and the logarithmic average water vapor partial pressure difference D.

Therefore, in the fuel cell system 400 according to the present embodiment, the steam amount P4 of the oxidizing gas supplied from the fuel cell 11 is calculated from Formulas (1) to (4), the constant $\alpha$, the temperature T1 and the temperature T2 (the temperatures T1 and T2 are measurable). In accordance with the present embodiment, the dew point Tdc of the oxidizing gas supplied to the fuel cell 11 can be calculated based on the calculated steam amount P4 without using the dew point sensor 21c shown in FIG. 1.

As with Embodiment 4, as shown in Formula (2) in FIG. 14, the steam amount P2 may be calculated as the difference between the steam amount P1 and the passed-through water amount W1. To be specific, as shown in Formula (2) in FIG. 14, the steam amount P2 may be calculated as the sum of the steam amount P3 and the oxidizing gas side generated water amount Wgc. Thus, the steam amount P4 of the oxidizing gas supplied to the fuel cell 11 is calculated from Formulas (1) to (4), the constant $\alpha$ and the temperature T1.

Meanwhile, in the fuel cell system 400 according to the present embodiment, the dew point Tdc of the oxidizing gas supplied to the fuel cell 11 can be controlled arbitrarily by changing the temperature T1 of the cooling water, discharged from the fuel cell 11, by controlling the flow rate of the cooling water, the heat radiation amount of the radiator and the current density. Note that the control apparatus 20 can easily control the current density by controlling the inverter connected to the fuel cell 11, as with Embodiment 4.

The other configurations are the same as those in Embodiments 1 to 4.

As above, in accordance with Embodiments 4 and 5, the dew point Tda of the fuel gas and the dew point Tdc of the oxidizing gas can be detected accurately without disposing the dew point sensor 21a and the dew point sensor 21c shown in FIG. 1. Moreover, in accordance with Embodiments 4 and 5, the dew point Tda of the fuel gas and the dew point Tdc of the oxidizing gas can be increased accurately without disposing the dew point control device 24 shown in FIG. 1. Each of Embodiments 4 and 5 explained the mode of humidifying the oxidizing gas, supplied from the oxidizing gas supplying device 17, by the total enthalpy heat exchanger 26 or the hot water humidifier 27. However, the present embodiment is not limited to this mode. For example, a mode of humidifying the fuel gas, supplied from the fuel gas supplying device 16, by the total enthalpy heat exchanger 26 or the hot water humidifier 27 may be realized. Moreover, a mode of humidifying both the fuel gas supplied from the fuel gas supplying device 16 and the oxidizing gas supplied from the oxidizing gas supplying device 17 by the total enthalpy heat exchanger 26 or the hot water humidifier 27 may be realized. In this case, the steam amount P3 (constant $\alpha$) of the oxidizing gas may be regarded as the steam amount P3 (constant $\alpha$) of the fuel gas. Further, the oxidizing gas side generated water amount Wgc may be regarded as the fuel gas side generated water amount Wga.

In a case where the same hydrogen generating device as Embodiment 4 is used as the fuel gas supplying device 16, and the generated fuel gas is further humidified by the total enthalpy heat exchanger 26 or the hot water humidifier 27, the steam amount P3 of the fuel gas can be calculated based on the operating condition of the fuel gas supplying device as with Embodiment 4. Moreover, in a case where the hydrogen tank is used as the fuel gas supplying device 16, and the fuel gas is humidified by the total enthalpy heat exchanger 26 or the hot water humidifier 27, the steam amount P3 of the fuel gas may be approximated as zero.

Industrial Applicability

A fuel cell system and an operating method thereof according to the present invention are industrially applicable as a fuel cell system which has an excellent durability and is capable of preventing the polymer electrolyte membrane from deteriorating when the polymer electrolyte fuel cell operated under the low humidification operating condition shifts to the open circuit state, and as an operating method thereof.

Moreover, a fuel cell system and an operating method thereof according to the present invention is industrially applicable to, for example, a power source of an electric car which requires a high output characteristic and a short start time at the same time, and a cogeneration system for domestic use which requires long-term reliability.

The invention claimed is:

1. A method for operating a fuel cell system comprising a fuel cell which generates electric power for a load using a fuel gas containing hydrogen and an oxidizing gas containing oxygen, a fuel gas supplying device which supplies the fuel gas to the fuel cell, an oxidizing gas supplying device which supplies the oxidizing gas to the fuel cell, and at least one of a temperature control device which controls a temperature of the fuel cell, the method comprising steps of:
generating the electric power by the fuel cell under a condition that a dew point of the fuel gas and a dew point of the oxidizing gas are lower than the temperature of the fuel cell;
when stopping the fuel cell system, causing the temperature of the fuel cell to be equal to or less than at least one of the dew point of the fuel gas to be supplied to the fuel cell and the dew point of the oxidizing gas to be supplied to the fuel cell; and
after the temperature of said fuel cell becomes equal to or less than at least one of the dew point of the fuel gas to be supplied to the fuel cell and the dew point of the oxidizing gas to be supplied to the fuel cell by the step of causing, cutting off the electrical connection between the fuel cell and the load.

2. The method according to claim 1, wherein the step of causing includes a step of controlling the temperature control device to decrease the temperature of the fuel cell to thereby cause the temperature of the fuel cell to be equal to or less than at least one of the dew point of the fuel gas to be supplied to the fuel cell and the dew point of the oxidizing gas to be supplied to the fuel cell.

3. The method according to claim 1, wherein at the step of causing, the temperature of the fuel cell is to be equal to or less than one of both of the dew point of the fuel gas to be supplied to the fuel cell and the dew point of the oxidizing gas to be supplied to the fuel cell.

4. The method according to claim 2, further comprising a step of, when decreasing the temperature of the fuel cell, controlling an output current density of the fuel cell to be equal to or lower than an output current density at the time of generating the electric power in the condition.

5. The method according to claim 2, wherein the step of causing includes a step of controlling at least one of a flow rate and a temperature of a cooling medium in the temperature control device to decrease the temperature of the fuel cell.

6. The method according to claim 1, wherein:
the fuel cell system further comprises a humidifying device which humidifies at least one of the fuel gas to be supplied to the fuel cell and the oxidizing gas to be supplied to the fuel cell, and
the step of causing includes a step of controlling the humidifying device to increase at least one of the dew point of the fuel gas to be supplied to the fuel cell and the dew point of the oxidizing gas to be supplied to the fuel cell to thereby cause the temperature of the fuel cell to be equal or less than to the at least one of the dew point of the fuel gas to be supplied to the fuel cell and the dew point of the oxidizing gas to be supplied to the fuel cell.

7. The method according to claim 6, further comprising a step of, when increasing the dew point, controlling an output current density of the fuel cell to be equal to or lower than an output current density at the time of generating the electric power under the condition.

8. The method according to claim 6, further comprising a step of controlling a temperature of a humidifier in the humidifying device by at least one of a flow rate and a temperature of at least one of the fuel gas to be supplied to the fuel cell and the oxidizing gas to be supplied to the fuel cell, thereby increasing at least one of the dew point of the fuel gas to be supplied to the fuel cell and the dew point of the oxidizing gas to be supplied to the fuel cell.

9. The method according to claim 1, wherein when cutting off the electrical connection between the fuel cell and the load and in a case where at least one of the dew point of the fuel gas to be supplied to the fuel cell and the dew point of the oxidizing gas to be supplied to the fuel cell becomes equal to or higher than the temperature of said fuel cell, the electrical connection between said fuel cell and the load is cut off.

10. The method according to claim 1, wherein in the step of causing, the fuel cell still generates the electric power.

11. The method according to claim 1, wherein the step of causing is a step of controlling at least one of the temperature of the fuel cell, the fuel gas supplied to the fuel cell, and the oxidizing gas supplied to the fuel cell such that the temperature of the fuel cell becomes equal to at least one of the dew point of the fuel gas to be supplied to the fuel cell and the dew point of the oxidizing gas to be supplied to the fuel cell.

12. The method according to claim 1, wherein the electrical connection between the fuel cell and the load is cut off in a state where a water content of the polymer electrolyte membrane is larger than that of the polymer electrolyte membrane before the step of causing.

13. The method according to claim 1, wherein in the step of causing, a nitrogen gas is not contained in a fuel gas passage of the fuel cell.

14. The method according to claim 1, wherein when cutting off the electrical connection between the fuel cell and the load, a nitrogen gas is not contained in a fuel gas passage of the fuel cell.

15. The method according to claim 1, wherein:
the method further comprising a step of measuring an elapsed time after the temperature of said fuel cell becomes equal to at least one of the dew point of the fuel gas to be supplied to the fuel cell and the dew point of the oxidizing gas to be supplied to the fuel cell by the step of causing, and
when the measured elapsed time reaches a predetermined time period, the electrical connection between the fuel cell and the load is cut off.

* * * * *